US012560998B2

(12) United States Patent
Nagata

(10) Patent No.: US 12,560,998 B2
(45) Date of Patent: Feb. 24, 2026

(54) DISPLAY DIMMING CONTROL APPARATUS, DISPLAY DIMMING CONTROL METHOD, RECORDING MEDIUM, AND DISPLAY DIMMING SYSTEM

(71) Applicant: Sony Group Corporation, Tokyo (JP)

(72) Inventor: Koji Nagata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 234 days.

(21) Appl. No.: 18/255,104

(22) PCT Filed: Nov. 15, 2021

(86) PCT No.: PCT/JP2021/041837
§ 371 (c)(1),
(2) Date: May 31, 2023

(87) PCT Pub. No.: WO2022/130865
PCT Pub. Date: Jun. 23, 2022

(65) Prior Publication Data
US 2024/0005827 A1　Jan. 4, 2024

(30) Foreign Application Priority Data
Dec. 16, 2020　(JP) ................................. 2020-208456

(51) Int. Cl.
　*B60K 35/234*　　(2024.01)
　*B60K 35/10*　　(2024.01)
　(Continued)

(52) U.S. Cl.
　CPC .............. *G06F 3/013* (2013.01); *B60K 35/10* (2024.01); *B60K 35/231* (2024.01);
　(Continued)

(58) Field of Classification Search
CPC ........... B60K 35/23; G09G 2320/0686; G09G 2380/10
See application file for complete search history.

(56) References Cited

U.S. PATENT DOCUMENTS 10,319,272 B1 * 6/2019 Carter ..................... G06F 3/013
10,921,596 B2 * 2/2021 Nocon ..................... H04N 5/58
(Continued)

FOREIGN PATENT DOCUMENTS

EP　　　　3549806 B1　9/2020
JP　　2008-058627 A　3/2008
(Continued)

OTHER PUBLICATIONS

International Search Report and Written Opinion mailed on Feb. 1, 2022, received for PCT Application PCT/JP2021/041837, filed on Nov. 15, 2021, 11 pages including English Translation.

*Primary Examiner* — Phong X Nguyen
(74) *Attorney, Agent, or Firm* — XSENSUS LLP

(57) ABSTRACT

A display dimming control apparatus includes: a display image generation unit that determines a display device position that is a position of a display device that emits image light in order to display an image on a transparent screen from a display apparatus having the display device; and a dimming processing control unit that controls a dimming apparatus having a plurality of dimming elements. The plurality of dimming elements independently control a dimming level of the screen for each of a plurality of tiles obtained by virtually dividing the screen The dimming processing control unit includes a dimming position determination unit that determines one or more dimming elements that control dimming levels of one or more tiles corresponding to a screen display position.

17 Claims, 18 Drawing Sheets

(51) Int. Cl.

| | |
|---|---|
| *B60K 35/231* | (2024.01) |
| *B60K 35/233* | (2024.01) |
| *B60K 35/235* | (2024.01) |
| *G06F 3/01* | (2006.01) |
| *B60K 35/65* | (2024.01) |
| *B60K 35/81* | (2024.01) |

(52) U.S. Cl.
CPC .......... *B60K 35/233* (2024.01); *B60K 35/234* (2024.01); *B60K 35/235* (2024.01); *B60K 35/65* (2024.01); *B60K 35/81* (2024.01); *B60K 2360/349* (2024.01); *G09G 2320/0233* (2013.01); *G09G 2320/0242* (2013.01); *G09G 2320/0686* (2013.01); *G09G 2354/00* (2013.01); *G09G 2360/144* (2013.01); *G09G 2380/10* (2013.01)

(56) References Cited

U.S. PATENT DOCUMENTS

| | | | | |
|---|---|---|---|---|
| 11,628,710 | B2 * | 4/2023 | Tanaka ........................ | B60J 3/04 |
| | | | | 296/97.2 |
| 11,688,355 | B2 * | 6/2023 | Tsuchida ................ | G09G 3/346 |
| | | | | 345/694 |
| 2007/0097333 | A1 | 5/2007 | Zavarehi et al. | |
| 2012/0242678 | A1 * | 9/2012 | Border ............... | G02B 27/0093 |
| | | | | 345/589 |

| | | | | |
|---|---|---|---|---|
| 2014/0062839 | A1 | 3/2014 | Dominici et al. | |
| 2018/0024359 | A1 | 1/2018 | Yoneyama | |
| 2018/0120562 | A1 * | 5/2018 | Yata ................... | G02F 1/133528 |
| 2018/0277028 | A1 * | 9/2018 | Mader .................. | B60K 35/233 |
| 2019/0096365 | A1 * | 3/2019 | Pasca ....................... | G09G 5/10 |
| 2019/0243133 | A1 * | 8/2019 | Liao ....................... | B60K 35/22 |
| 2020/0135074 | A1 * | 4/2020 | Wooster ................ | G09G 3/006 |
| 2020/0301135 | A1 * | 9/2020 | Yano ................... | H04N 13/363 |
| 2021/0065604 | A1 * | 3/2021 | Tsai ...................... | G09G 3/2003 |
| 2021/0114439 | A1 * | 4/2021 | Moschek .................. | B60J 3/04 |
| 2021/0197666 | A1 * | 7/2021 | Tanaka ................. | B60W 40/09 |
| 2021/0350765 | A1 * | 11/2021 | Mi ........................ | G09G 3/3648 |
| 2022/0165188 | A1 * | 5/2022 | Yamazaki ............. | G09G 3/001 |
| 2022/0413608 | A1 * | 12/2022 | Grzesiak ................ | G06F 3/012 |

FOREIGN PATENT DOCUMENTS

| | | | |
|---|---|---|---|
| JP | 2013-076956 | A | 4/2013 |
| JP | 2015-099293 | A | 5/2015 |
| JP | 2015-112953 | A | 6/2015 |
| JP | 2020-087049 | A | 6/2020 |
| JP | 2020-087050 | A | 6/2020 |
| JP | 2020-190677 | A | 11/2020 |
| WO | WO-2005124431 | A1 | 12/2005 |
| WO | WO-2017060966 | A1 | 4/2017 |
| WO | 2020/017403 | A1 | 1/2020 |
| WO | WO-2020110848 | A1 | 6/2020 |

* cited by examiner

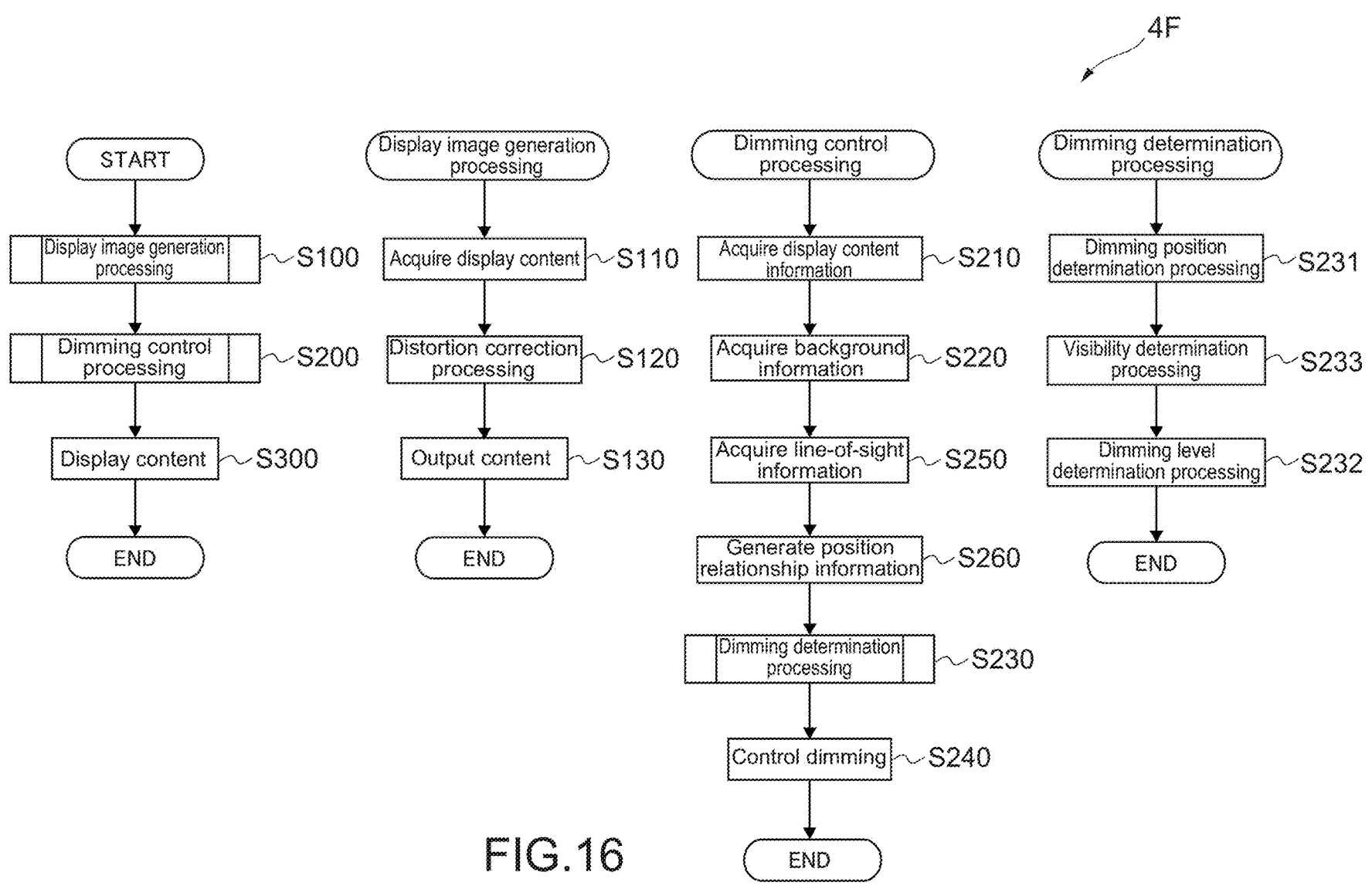

4F

Dimming determination processing

Dimming position determination processing S231

Visibility determination processing S233

Dimming level determination processing S232

END

Dimming control processing

Acquire display content information S210

Acquire background information S220

Acquire line-of-sight information S250

Generate position relationship information S260

Dimming determination processing S230

Control dimming S240

END

Display image generation processing

Acquire display content S110

Distortion correction processing S120

Output content S130

END

START

Display image generation processing S100

Dimming control processing S200

Display content S300

END

FIG.16

DISPLAY DIMMING CONTROL APPARATUS, DISPLAY DIMMING CONTROL METHOD, RECORDING MEDIUM, AND DISPLAY DIMMING SYSTEM

CROSS-REFERENCE TO RELATED APPLICATIONS

The present application is based on PCT filing PCT/JP2021/041837, filed Nov. 15, 2021, which claims priority to Japanese Patent Application No. 2020-208456, filed with the Japan Patent Office on Dec. 16, 2020, the entire contents of each are incorporated herein by reference.

TECHNICAL FIELD

The present disclosure relates to a display dimming system including a display apparatus that displays (projects) an image on a transparent screen, to a dimming apparatus that controls the brightness of the screen, and to a display dimming control apparatus that controls the display apparatus and the dimming apparatus. The present disclosure also relates to a display dimming control apparatus, to a display dimming control method executed by the display dimming control apparatus, and to a non-transitory computer-readable recording medium for recording a dimming control program executed by the display dimming control apparatus.

BACKGROUND ART

A display apparatus (head-up display system) that displays (projects) an image on a windshield of a vehicle as a screen is known (Patent Literature 1).

CITATION LIST

Patent Literature

Patent Literature 1: Japanese Patent Application Laid-open No. 2020-190677

DISCLOSURE OF INVENTION

Technical Problem

When displaying an image on a transparent screen such as a window of a vehicle or building, the brightness of an environment, which is the background of the image, and influences of objects may lower the visibility of the image. One of measures for coping with it can be attaching to the entire surface of the screen a smoke film for reducing incident light passing through the window or a dimming film with a variable dimming level. This method uniformly reduces or controls the brightness of the entire surface of the screen. Therefore, controlling the brightness (reducing the brightness) of the screen in order to increase the visibility of the image may lower the visibility of a background environment of the screen.

In view of the above-mentioned circumstances, it is an object of the present disclosure to enhance the visibility of an image displayed on a transparent screen and the visibility of a background environment of the screen at the same time.

Solution to Problem

A display dimming control apparatus according to an embodiment of the present disclosure includes:

a display image generation unit that determines a display device position that is a position of a display device that emits image light in order to display an image on a transparent screen from a display apparatus having the display device; and a dimming processing control unit that controls a dimming apparatus having a plurality of dimming elements, the plurality of dimming elements independently controlling a dimming level of the screen for each of a plurality of tiles obtained by virtually dividing the screen, the dimming processing control unit including a dimming position determination unit that determines one or more dimming elements that control dimming levels of one or more tiles corresponding to a screen display position, the screen display position being a position on the screen at which the image is displayed by image light emitted from the display device position, and a dimming level determination unit that acquires background information that is information about a background environment of the screen and independently determines a dimming level for each of the one or more dimming elements on the basis of background information of each of the one or more tiles corresponding to the one or more dimming elements.

In accordance with the present embodiment, the brightness of only the screen display position at which the image is displayed is controlled and the brightness of the position at which the image on the screen is not displayed is not controlled. Accordingly, the visibility of the image increases due to the dimming, and at the same time, the visibility of the background environment of the screen does not lower.

The background information includes illuminance information that is information about illuminance of the background environment, and the dimming level determination unit independently determines the dimming level for each of the one or more dimming elements on the basis of illuminance information of each of the one or more tiles corresponding to the one or more dimming elements.

In accordance with the present embodiment, the brightness of each of the tiles obtained by virtually dividing the screen on which the image is displayed is controlled independently at a different dimming level in accordance with a difference in illuminance of the background environment (e.g., the presence/absence of direct sunlight). Accordingly, in a case where the background environment of a portion of the image is bright and the background environment of the other portion of the image is dark, it is possible to increase the dimming level (lower the transmittance) for the bright portion and to make the dimming level relatively low for the dark portion. Providing suitable dimming levels can secure necessary sufficient visibility and can also keep the background field-of-view favorable. It can increase the visibility of the display image and can keep the background field-of-view more favorable.

The dimming processing control unit may further include a visibility determination unit that determines visibility of each of the one or more tiles, and the dimming level determination unit may independently determine, on the basis of the visibility, the dimming level for each of the one or more dimming elements.

In accordance with the present embodiment, the brightness of each of the tiles obtained by virtually dividing the screen on which the image is displayed is controlled independently at a different dimming level in accordance with the visibility of the image. This can display an image with high visibility for the viewer.

The background information may include background color information that is information about color of the background environment, and the visibility determination unit may determine the visibility of each of the one or more tiles on the basis of background color information of each of the one or more tiles corresponding to the one or more dimming elements and image color information that is information about color of an image displayed for each of the one or more tiles.

In accordance with the present embodiment, the brightness of each of the tiles obtained by virtually dividing the screen on which the image is displayed is controlled independently at a different dimming level. Providing suitable dimming levels can secure necessary sufficient visibility and can also keep the background field-of-view favorable in accordance with the visibility of the image (chrominance contrast based on the background color information and the image color information). It can increase the visibility of the display image and can keep the background field-of-view more favorable.

The background information may include luminance information that is information about luminance of the background environment, and the visibility determination unit may determine the visibility of each of the one or more tiles on the basis of background luminance information of each of the one or more tiles corresponding to the one or more dimming elements and image luminance information that is information about luminance of an image displayed for each of the one or more tiles.

In accordance with the present embodiment, the brightness of each of the tiles obtained by virtually dividing the screen on which the image is displayed is controlled independently at a different dimming level in accordance with the visibility of the image (luminance contrast based on the background luminance information and the image luminance information). Providing suitable dimming levels can secure necessary sufficient visibility and can also keep the background field-of-view favorable. It can increase the visibility of the display image and can keep the background field-of-view more favorable.

The dimming processing control unit may further include a position relationship information generation unit that generates position relationship information on the basis of line-of-sight information that is information indicating a line-of-sight of a viewer who views the image, the position relationship information being information for converting the display device position into one or more dimming elements that control dimming levels of one or more tiles corresponding to a screen display position, the screen display position being a position on the screen at which the image is displayed by image light emitted from the display device position, and the dimming position determination unit may determine the one or more dimming elements on the basis of the position relationship information.

In accordance with the present embodiment, a screen display position (position on the screen on which the image is displayed) that is a dimming target is determined on the basis of a line-of-sight position of an individual viewer. It can increase the possibility that the brightness of the image that the viewer views is controlled as compared to a case of determining one or more dimming elements that control the dimming levels simply on the basis of a line-of-sight position for a viewer (model) who has an average body shape.

The visibility determination unit may determine the visibility also on the basis of line-of-sight information and the position relationship information, the line-of-sight information being information indicating a line-of-sight of a viewer who views the image.

In accordance with the present embodiment, the visibility of the image when viewing the image in the line-of-sight of the individual viewer is determined. The brightness of each of the tiles obtained by virtually dividing the screen on which the image is displayed is controlled independently at a different dimming level in accordance with the estimated visibility of the image of the individual viewer. It can increase the visibility of the display image and can keep the background field-of-view more favorable because the visibility for the individual viewer is higher as compared to a case of determining a dimming level simply in accordance with visibility for a viewer (model) who has an average body shape.

The line-of-sight information may be estimated on the basis of positions of eyes of the viewer.

In accordance with the present embodiment, a screen display position (position on the screen on which the image is displayed) that is a dimming target is determined on the basis of an estimated line-of-sight of an individual viewer position. This increases the possibility that the brightness of the image that the viewer views is controlled. Moreover, in accordance with the present embodiment, visibility of the image (estimated visibility of the individual viewer) when viewing the image in the estimated line-of-sight of the individual viewer is determined. The brightness of each of the tiles obtained by virtually dividing the screen on which the image is displayed is controlled independently at a different dimming level in accordance with the estimated visibility of the image of the individual viewer. It can increase the visibility of the display image and can keep the background field-of-view more favorable because the visibility for the individual viewer is higher as compared to a case of determining a dimming level simply in accordance with visibility for a viewer (model) who has an average body shape.

The line-of-sight information may be generated by dynamically measuring positions of eyes of the viewer and a line-of-sight of the viewer.

In accordance with the present embodiment, a line-of-sight position of the viewer that dynamically changes on the basis of a screen display position (position on the screen on which the image is displayed) that is a dimming target is determined. This constantly increases the possibility that the brightness of the image that the viewer views is controlled even when for example a change in attitude of the viewer changes the line-of-sight of the viewer. Moreover, in accordance with the present embodiment, visibility of the image (visibility of the individual viewer at each moment) when viewing the image in the line-of-sight of the individual viewer that changes at each moment is determined. The brightness of each of the tiles obtained by virtually dividing the screen on which the image is displayed is controlled independently at a different dimming level in accordance with the visibility of the image of the individual viewer at each moment. It constantly can increase the visibility of the display image and can keep the background field-of-view more favorable even when for example a change in attitude of the viewer changes the line-of-sight of the viewer as compared to a case of determining a dimming level in accordance with visibility based on an estimated line-of-sight of an individual viewer position.

The dimming level determination unit may determine not to control dimming of one or more dimming elements corresponding to the screen display position when the dimming level determination unit determines that the viewer is not viewing the screen display position on the basis of the line-of-sight information.

In accordance with the present embodiment, the brightness of the position not viewed by the viewer is not controlled when for example a change in attitude of the viewer changes the viewer's viewpoint on the screen that dynamically changes at each moment. This reduces cases of unnecessarily controlling the brightness of the screen. It lowers the possibility that the visibility of the background environment of the screen (in particular, a position that the viewer is actually viewing) may lower.

The screen may have a freeform curved surface.

In accordance with the present embodiment, since the screen has the freeform curved surface, displaying (projecting) a target image on the screen without correction causes a displayed image to have a distorted shape for the viewer. In accordance with the present embodiment, it is sufficient that the display device position is determined so as to reduce the distortion of the image when the viewer views the displayed image. This enables the viewer to view the image with the distortion reduced.

The screen may be a windshield of a vehicle.

Since the windshield of the vehicle has the freeform curved surface, displaying (projecting) a target image on the screen without correction causes a displayed image to have a distorted shape for the viewer. In accordance with the present embodiment, it is sufficient that the display device position is determined so as to reduce the distortion of the image when the viewer views the displayed image. This enables the viewer to view the image with the distortion reduced. It thus enhances the safety.

The display apparatus may be a projection apparatus capable of projecting the image on an entire region in a width-wise direction of the windshield.

Development of automated driving in future can grow needs for both a viewer who sits on a driver's seat and a viewer who sits on a front passenger's seat to simultaneously view an image (e.g., an image of infotainment content) on a wide and large screen. In this case, an image easy to view for both the viewer who sits on the driver's seat and the viewer who sits on the front passenger's seat can be displayed.

The screen may be a window of a vehicle.

Development of automated driving in future can grow needs for viewers who are passengers of the vehicle to simultaneously view an image (e.g., an image of infotainment content) on a wide and large screen (covering the entire surface of the windshield and even the left and right side-view windows). In this case, an image easy to view for both viewers can be displayed.

A display dimming control method according to an embodiment of the present disclosure includes:

determining a display device position that is a position of a display device that emits image light in order to display an image on a transparent screen from a display apparatus having the display device;

controlling a dimming apparatus having a plurality of dimming elements, the plurality of dimming elements independently controlling a dimming level of the screen for each of a plurality of tiles obtained by virtually dividing the screen;

determining one or more dimming elements that control dimming levels of one or more tiles corresponding to a screen display position, the screen display position being a position on the screen at which the image is displayed by image light emitted from the display device position; and acquiring background information that is information about a background environment of the screen and independently determines a dimming level for each of the one or more dimming elements on the basis of background information of each of the one or more tiles corresponding to the one or more dimming elements.

A non-transitory computer-readable recording medium according to an embodiment of the present disclosure records a display dimming control program that causes a dimming processing control unit of a display dimming control apparatus including a display image generation unit that determines a display device position that is a position of a display device that emits image light in order to display an image on a transparent screen from a display apparatus having the display device, and the dimming processing control unit that controls a dimming apparatus having a plurality of dimming elements, the plurality of dimming elements independently controlling a dimming level of the screen for each of a plurality of tiles obtained by virtually dividing the screen, to operate as:

a dimming position determination unit that determines one or more dimming elements that control dimming levels of one or more tiles corresponding to a screen display position, the screen display position being a position on the screen at which the image is displayed by image light emitted from the display device position; and a dimming level determination unit that acquires background information that is information about a background environment of the screen and independently determines a dimming level for each of the one or more dimming elements on the basis of background information of each of the one or more tiles corresponding to the one or more dimming elements.

A display dimming system according to an embodiment of the present disclosure includes:

a display apparatus that has a display device and displays an image on a transparent screen;

a dimming apparatus having a plurality of dimming elements, the plurality of dimming elements independently controlling a dimming level of the screen for each of a plurality of tiles obtained by virtually dividing the screen; and a display dimming control apparatus including a display image generation unit that determines a display device position that is a position of a display device that emits image light in order to display an image on the screen from the display apparatus, and a dimming processing control unit including a dimming position determination unit that determines one or more dimming elements that control dimming levels of one or more tiles corresponding to a screen display position, the screen display position being a position on the screen at which the image is displayed by image light emitted from the display device position, and a dimming level determination unit that acquires background information that is information about a background environment of the screen and independently determines a dimming level for each of the one or more dimming elements on the basis of background information of each of the one or more tiles corresponding to the one or more dimming elements, the display dimming control apparatus controlling the dimming apparatus.

BRIEF DESCRIPTION OF DRAWINGS

FIG. 16 A diagram showing an operation flow of the display dimming system.

MODE(S) FOR CARRYING OUT THE INVENTION

Hereinafter, embodiments of the present disclosure will be described with reference to the drawings.

I. FIRST EMBODIMENT

1. Outline of Head-Up Display System

Figure 1:
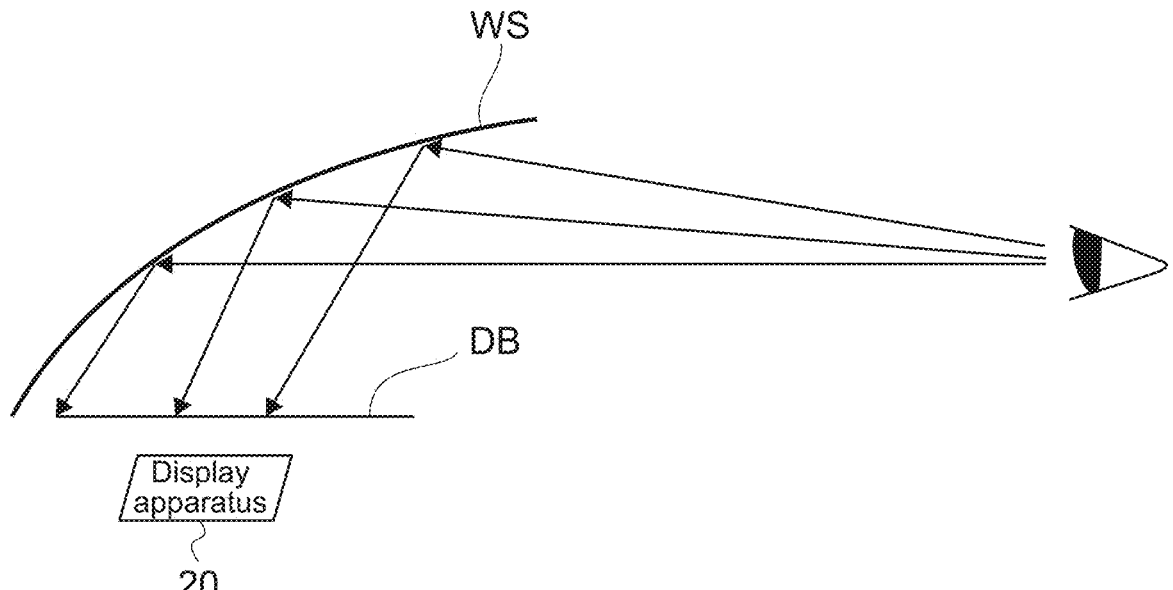
FIG. 1 A diagram schematically showing a head-up display system.

FIG. 1 schematically shows a head-up display system.

Each embodiment of the present disclosure relates to a head-up display system mounted on a vehicle. A display apparatus 20 is a direct projection type and mounted on a dashboard DB. The display apparatus 20 emits image light. The image light is reflected on a windshield WS as a screen. This operation displays an image (virtual image) on the windshield WS. A viewer (passenger as a driver) views an image displayed (projected) on the windshield WS. The windshield WS of the vehicle is transparent and has a freeform curved surface.

Typically, the screen is the windshield WS of the vehicle, though not limited thereto. The screen may be a window (e.g., a side-view window, a rear-view window, a roof window) of the vehicle other than the windshield WS. The screen may be a building window, a window of a vehicle other than a car, or the like as long as it is transparent. In addition, the screen may be a region covering the entire region of the windshield WS and the left and right side-view windows.

Development of automated driving in future can grow needs for both a viewer who sits on a driver's seat and a viewer who sits on a front passenger's seat to simultaneously view an image (e.g., an image of infotainment content) on a wide and large screen (covering the entire surface of the windshield and even the left and right side-view windows) displayed on the windshield. For example, providing a smoke film for controlling the brightness (reducing the brightness) of the entire windshield in order to increase the visibility of the image may lower the visibility of a background environment of the windshield (external environment in the front of the vehicle). However, the windshield of the vehicle needs to have high visibility for confirming safety of the external environment. Controlling the brightness of the entire windshield at a dimming level that does not lower the visibility of the background environment of the windshield may lower the visibility of the image in turn.

In view of the above-mentioned circumstances, each embodiment of the present disclosure realizes a head-up display system that controls the brightness of only a display position where the image on the windshield (screen) is displayed.

2. Outline of Screen and Dimming Element

Figure 2:
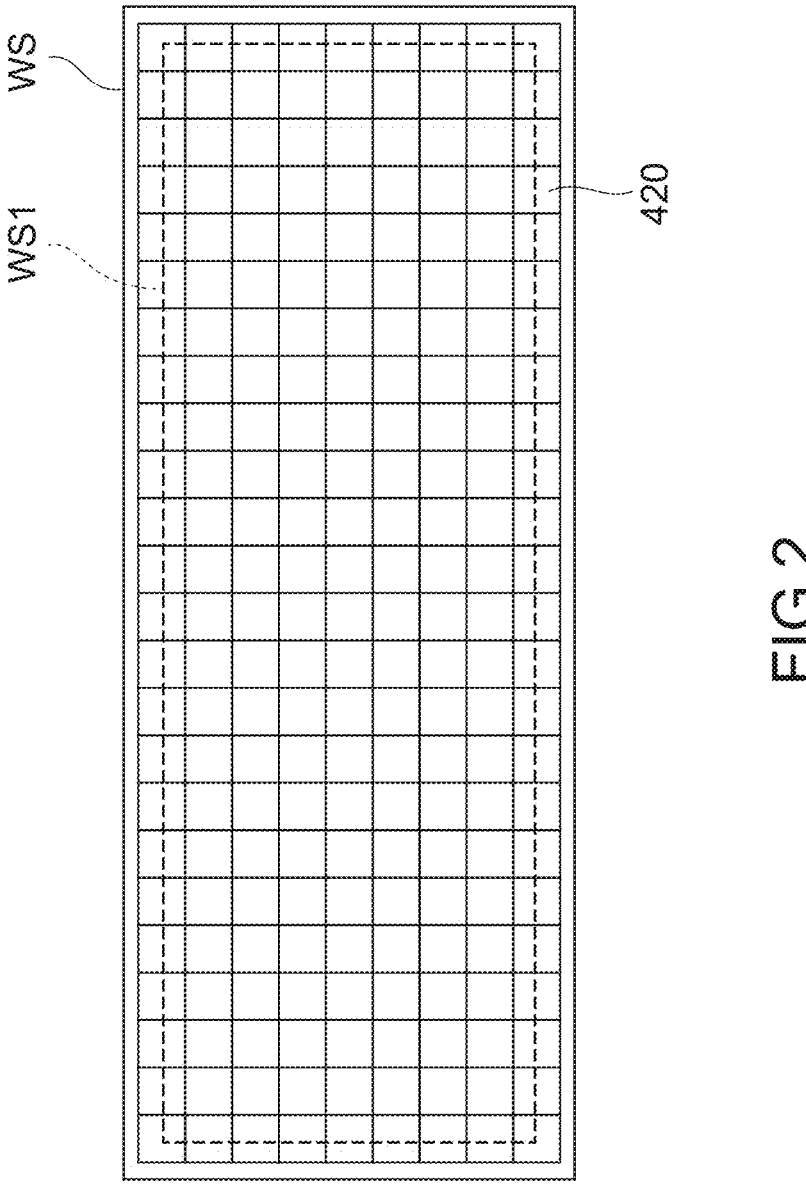
FIG. 2 A diagram schematically showing a screen and dimming elements according to each embodiment of the present disclosure.

FIG. 2 schematically shows a screen and dimming elements according to each embodiment of the present disclosure.

The display apparatus 20 (FIG. 1) can display (project) an image on a display area WS1 that is substantially the entire surface of the windshield WS as the transparent screen. A plurality of dimming elements 420 is mounted on the windshield WS without any gaps so as to cover the entire region of the display area WS1.

The plurality of dimming elements 420 can each independently change the dimming level. Accordingly, the dimming elements 420 can independently control the dimming level of the windshield WS for each of a plurality of tiles obtained by virtually dividing the windshield WS. The size of each dimming element 420 is not limited. For example, each dimming element 420 has several square centimeters. For example, a guest-host type liquid-crystal film, a polymer dispersed liquid crystal (PDLC) film, or a suspended particle device (SPD) film can realize the dimming elements 420.

It should be noted that for the sake of convenience, the windshield WS and the display area WS1 are shown as rectangles and the dimming elements 420 are shown as squares. However, the windshield WS has a freeform curved surface and has a shape depending on types of cars. The shape of the display area WS1 depends on the shape of the windshield WS. The shape and arrangement of the dimming elements 420 also depend on the shape of the windshield WS. The shape and arrangement of the dimming elements 420 may be any shape and arrangement easy for tiling depending on the shape of the actual windshield WS.

3. Configuration of Display Dimming System

Figure 3:
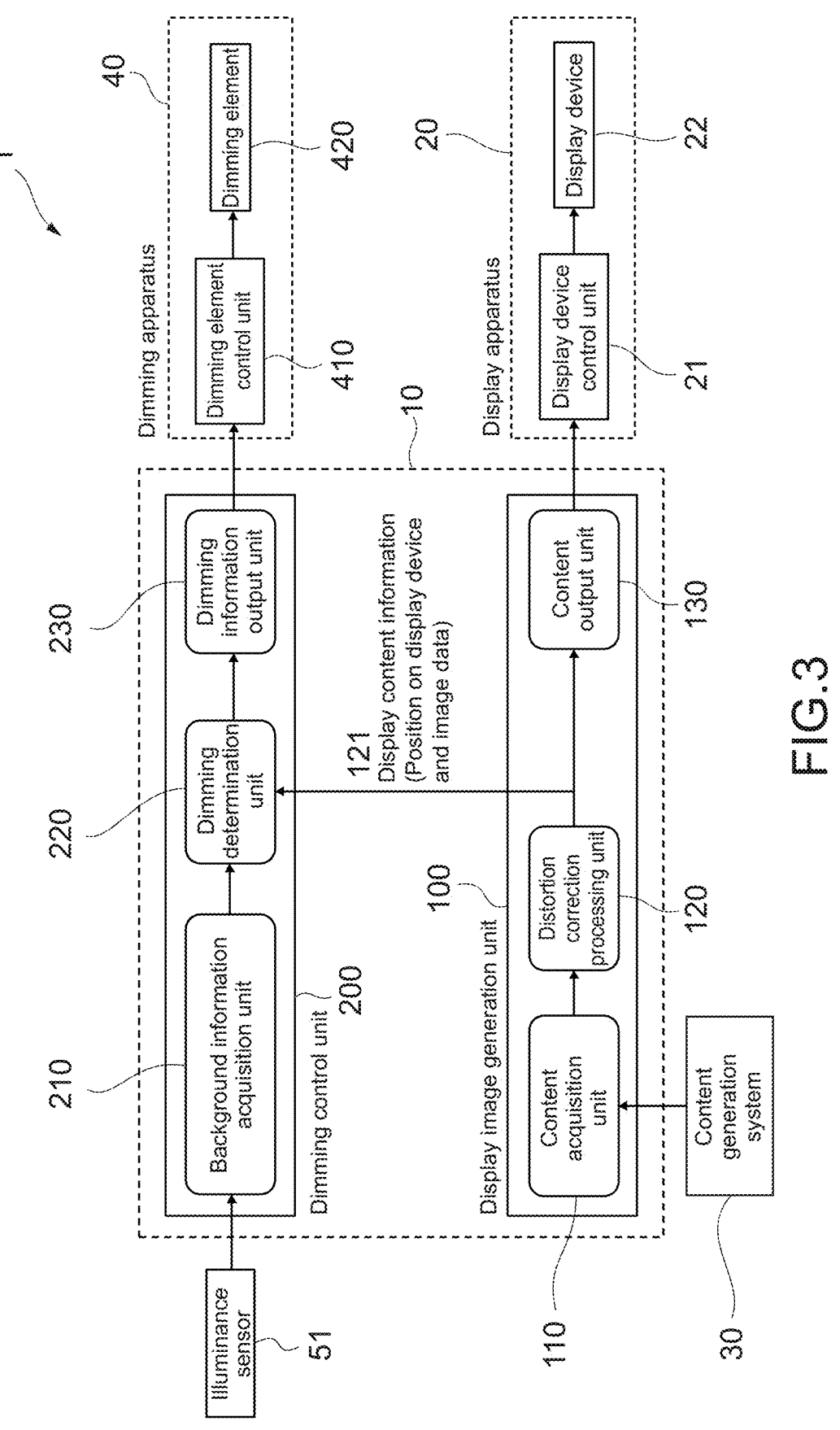
FIG. 3 A diagram showing a configuration of a display dimming system according to a first embodiment of the present disclosure.

FIG. 3 shows a configuration of a display dimming system according to a first embodiment of the present disclosure.

A display dimming system 1 is a head-up display system mounted on a vehicle. The display dimming system 1 includes a display dimming control apparatus 10, the display apparatus 20, and a dimming apparatus 40. The display dimming control apparatus 10 includes a display image generation unit 100 and a dimming control unit 200.

The display image generation unit 100 acquires data (image, metadata) about content (e.g., safety-related content, navigation content, infotainment content, or vehicle information content such as speed) from a content generation system 30. The display dimming control apparatus 10 realizes a content acquisition unit 110, a distortion correction processing unit 120, and a content output unit 130 by loading a display control program recorded on a ROM to a RAM and executing the display control program by a CPU. The display dimming control apparatus 10 acquires an image of content (the content acquisition unit 110). The display dimming control apparatus 10 generates drawing data of the image obtained by correction to reduce a distortion when the viewer views the image (the distortion correction processing unit 120). The display dimming control apparatus 10 outputs the drawing data to the display apparatus 20 (the content output unit 130).

The display apparatus 20 is, for example, mounted on a dashboard of the vehicle. The display apparatus 20 includes a display device control unit 21 and a display device 22. The display device 22 uses a micro LED element, e.g., a micro-LED panel, as a light source. The display device control unit 21 controls the display device 22 to display (project) an image toward the windshield of the vehicle that is the transparent screen on the basis of the drawing data input from the display dimming control apparatus 10. The viewer views an image displayed (projected) from the display device 22 and reflected on the windshield. The display device 22 (e.g., a micro-LED panel) is mounted on, for example, an entire region in a width-wise direction of the dashboard or substantially the entire region in the width-wise direction of the dashboard. This displays an image on the entire region in the width-wise direction of the dashboard or substantially the entire region in the width-wise direction of the dashboard. The display device 22 may be a single continuous panel or may include a plurality of panels divided in the width-wise direction of the dashboard in the entire region in the width-wise direction of the dashboard or substantially the entire region in the width-wise direction of the dashboard.

Here, the display apparatus is a display apparatus that displays (or emits) light from the display panel directly on the screen without a distortion correction lens or distortion correction mirror in a system using the display device (e.g., a liquid crystal display (LCD), an organic light-emitting diode (LED) display, a micro-LED display).

Moreover, the display apparatus may be a display apparatus using a distortion correction lens or distortion correction mirror and a projector.

The content generation system 30 refers to a group of a plurality of independent apparatuses that generates content of an image displayed on the display apparatus 20. The content generation system 30 includes, for example, a safety-related content generation apparatus, a navigation apparatus, an infotainment apparatus, and a vehicle information generation apparatus. The safety-related content generation apparatus, the navigation apparatus, the infotainment apparatus, and the vehicle information generation apparatus each generate data (image, metadata) of content and output it to the display dimming control apparatus 10.

The dimming apparatus 40 has the plurality of dimming elements 420. The plurality of dimming elements 420 has configurations shown in FIG. 2. The plurality of dimming elements 420 is mounted without any gaps so as to cover the windshield. The plurality of dimming elements 420 can each independently change the dimming level. Accordingly, the dimming elements 420 can independently control the dimming level of the windshield for each of a plurality of tiles obtained by virtually dividing the windshield.

The dimming control unit 200 realizes a background information acquisition unit 210, a dimming determination unit 220, and a dimming information output unit 230 by loading a display control program recorded on a ROM to a RAM and executing the display control program by a CPU. The dimming control unit 200 acquires information about illuminance (illuminance information) of a background environment of the windshield (external environment in the front of the vehicle) from an illuminance sensor 51 (the background information acquisition unit 210). The dimming control unit 200 independently determines a dimming level for each of the plurality of dimming elements 420 on the basis of the illuminance information (the dimming determination unit 220). The dimming control unit 200 outputs the dimming level for each of the plurality of dimming elements 420 to the dimming apparatus 40 (the dimming information output unit 230).

4. Operation of Display Dimming System

Figure 4:
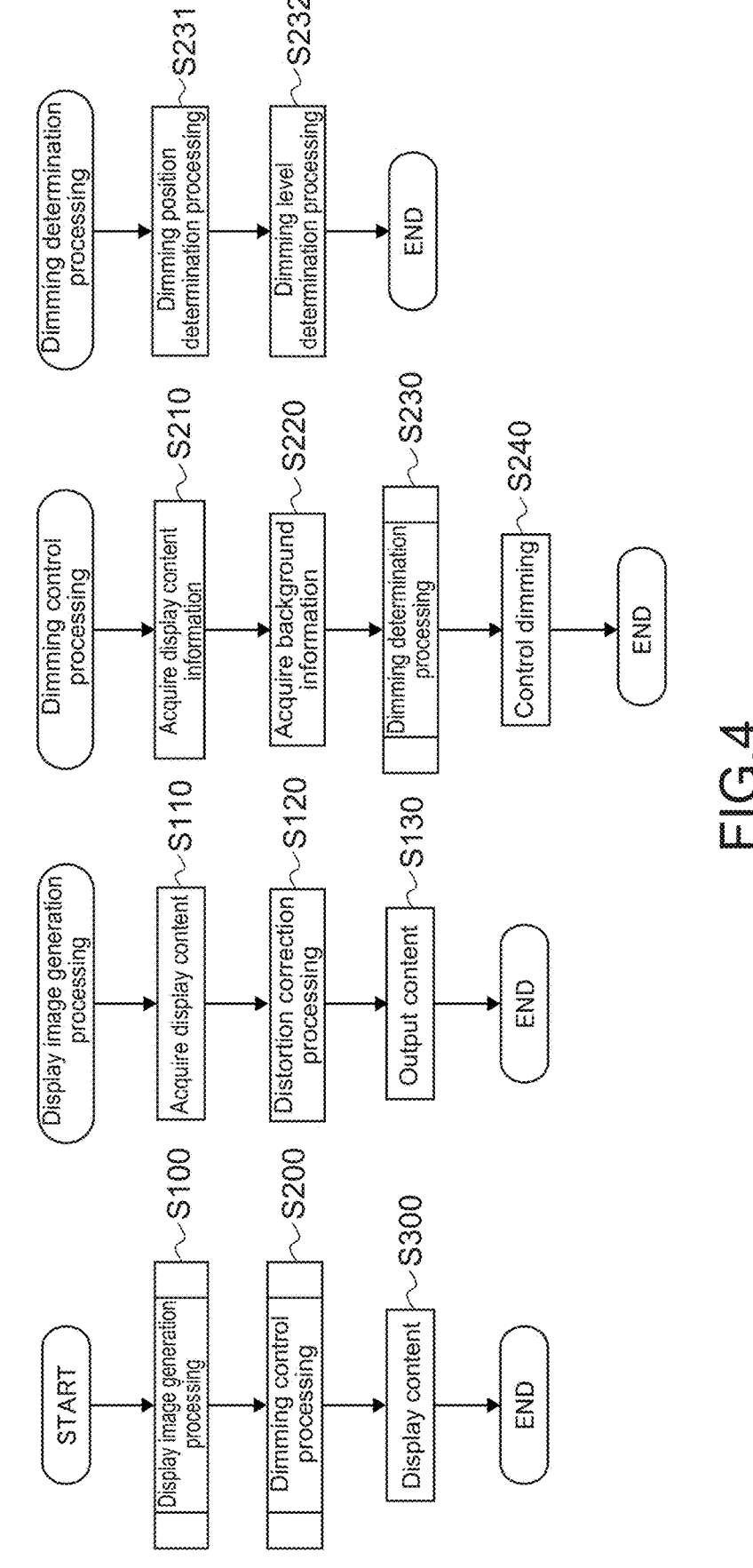
FIG. 4 A diagram showing an operation flow of the display dimming system.

FIG. 4 shows an operation flow of the display dimming system.

(1) Step S100: Display Image Generation Processing

In an operation flow 1F of the display dimming system, the content acquisition unit 110 of the display image generation unit 100 acquires image data of content generated by the content generation system 30 (Step S110).

The distortion correction processing unit 120 of the display image generation unit 100 corrects an image displayed on the windshield so as to reduce a distortion of the image when the viewer views the image. Specifically, the distortion correction processing unit 120 determines a position (display device position) of a display device (micro-LED) that emits image light in order to display an image (image in a target shape) of content on the windshield from the display apparatus 20. The distortion correction processing unit 120 generates corrected image drawing data by drawing the image of the content on the basis of the determined display device position (Step S120).

The content output unit 130 of the display image generation unit 100 outputs the corrected image drawing data generated by the distortion correction processing unit 120 to the display apparatus 20 (Step S130).

(2) Step S200: Dimming Control Processing

The dimming determination unit 220 of the dimming control unit 200 acquires display content information 121 from the display image generation unit 100. The display content information 121 includes the image data of the content generated by the content generation system 30 and the display device position generated by the distortion correction processing unit 120 (Step S210).

The background information acquisition unit 210 of the dimming control unit 200 acquires information (background information) about the background environment of the windshield (screen) (Step S220). Specifically, the background information acquisition unit 210 acquires illuminance information 211 as the background information from the illuminance sensor 51. The illuminance information 211 indicates illuminance of the background environment.

Figure 5:
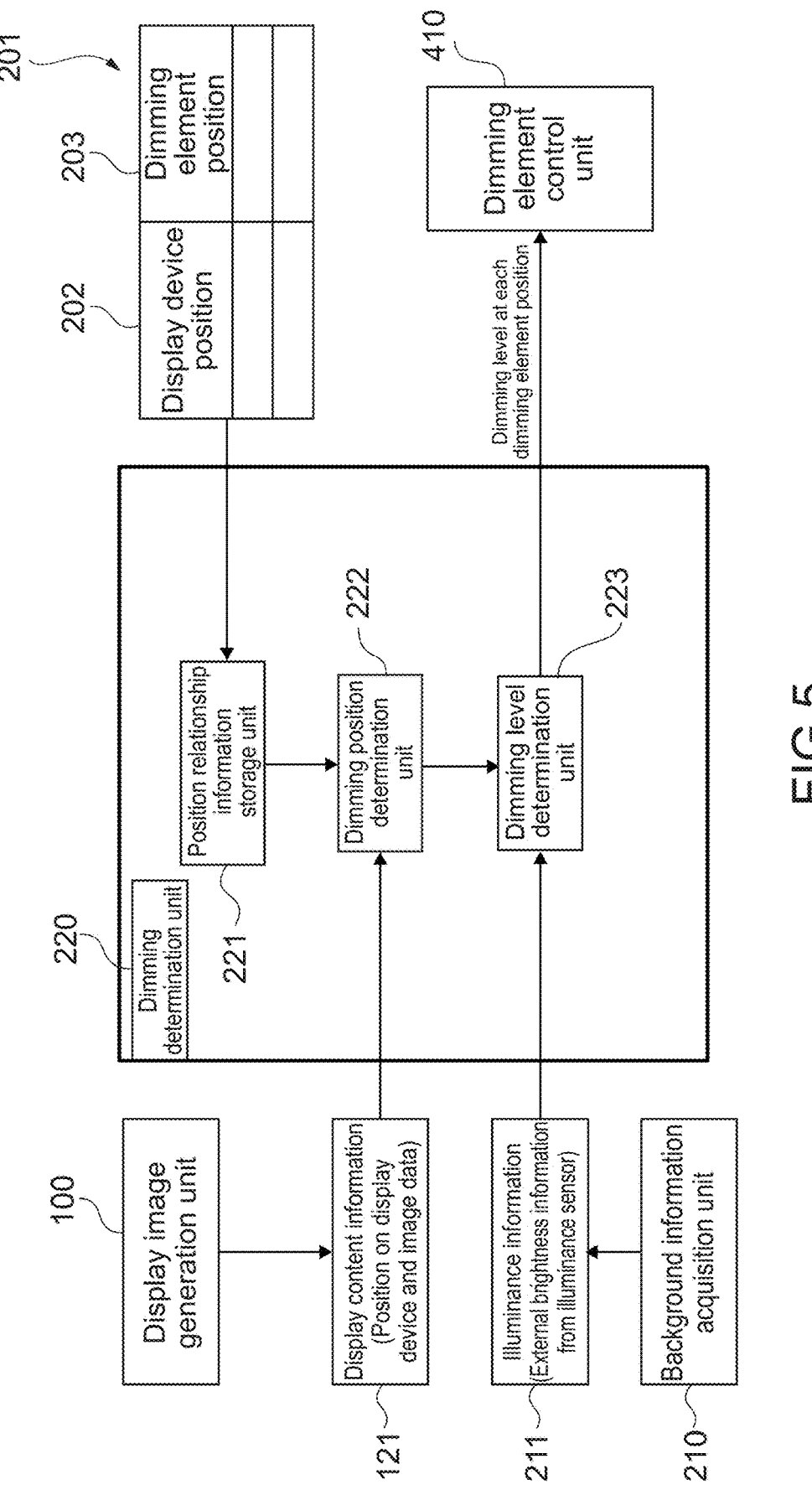
FIG. 5 A diagram showing functional configurations of a dimming determination unit.

FIG. 5 shows functional configurations of the dimming determination unit.

A position relationship information storage unit 221 of the dimming determination unit 220 stores position relationship information 201. The position relationship information 201 information for converting a display device position 202 (coordinates of the micro-LED) into a position 203 (coordinates) of the dimming elements 420. The position relationship information 201 is, for example, a lookup table, a conversion function, and the like.

A reason why the display device position 202 (coordinates of the micro-LED) can be converted into a dimming element position 203 will be described. It is assumed that a viewer (e.g., a driver) who has an average body shape views, from average eyes positions, image light emitted to the screen from the display device position 202. Uniquely determining eyes positions uniquely determines a position (screen display position) at which the image is displayed on the screen, corresponding to the display device position 202 (they are calculated in advance). The screen is covered with the plurality of dimming elements 420. That is, the plurality of dimming elements 420 virtually divides the screen into a plurality of tiles (FIG. 2). Therefore, determining a screen display position on the screen uniquely determines a tile (one of tiles obtained by virtually dividing the screen) including this screen display position. Determining the tile uniquely determines a dimming element 420 that controls the brightness of this tile.

A dimming position determination unit 222 of the dimming determination unit 220 refers to the position relationship information 201 of the position relationship information storage unit 221 and determines one or more dimming elements 420 that control the dimming levels (Step S231). Specifically, the dimming position determination unit 222 refers to the position relationship information 201 and converts this display device position 202 (included in the display content information 121 acquired from the display image generation unit 100) into the dimming element position 203. Accordingly, the dimming position determination unit 222 determines one or more dimming elements 420 that control dimming levels of one or more tiles corresponding to a screen display position at which an image is displayed by image light emitted from the display device position. In other words, the dimming position determination unit 222 determines only dimming elements 420 that cover a screen display position at which the image is displayed as dimming level control targets and does not determine dimming elements 420 that cover positions at which the image on the screen is not displayed as dimming level control targets (does not control their brightness).

A dimming level determination unit 223 of the dimming determination unit 220 acquires illuminance information 211 from the background information acquisition unit 210. The dimming level determination unit 223 acquires position information of the one or more dimming elements 420 that control the dimming levels from the dimming position determination unit 222. The dimming level determination unit 223 independently determines a dimming level for each of the dimming elements 420 on the basis of the background information (illuminance information 211) of each of the tiles corresponding to the dimming elements 420 (Step S232). For example, in a case where the illuminance of the background environment of some tiles of the tiles obtained by virtually dividing the screen is high (e.g., direct sunlight hits the screen partially), the dimming level determination unit 223 independently determines a dimming level for each of the dimming elements 420 so as to increase the dimming levels of the dimming elements 420 that cover that tile (lower the transmittance).

The dimming determination unit 220 of the dimming control unit 200 independently determines a dimming level for each of the plurality of dimming elements 420 as described above (Step S230). The dimming information output unit 230 outputs the dimming level for each of the plurality of dimming elements 420 to the dimming apparatus 40 (Step S240).

(3) Step S300: Content Image Display

The display apparatus 20 acquires corrected image drawing data input from the display image generation unit 100 of the display dimming control apparatus 10 (Step S130). The display device control unit 21 controls the display device 22 to display (project) the image toward the windshield of the vehicle as the screen on the basis of the drawing data.

The dimming apparatus 40 acquires a dimming level for each of the plurality of dimming elements 420 input from the dimming control unit 200 of the display dimming control apparatus 10 (Step S240). A dimming element control unit 410 independently controls the plurality of dimming elements 420 on the basis of the dimming level for each of the dimming elements 420, and changes a dimming rate (transmittance) for each of the dimming elements 420.

As described above, in accordance with the first embodiment, assuming that a viewer (e.g., a driver) who has an average body shape views the screen from average eyes positions, the brightness of only the screen display position at which the image is displayed is controlled and the brightness of the position at which the image on the screen is not displayed is not controlled. Accordingly, the visibility of the image increases due to the dimming, and at the same time, the visibility of the background environment of the screen does not lower. In addition, in accordance with the first embodiment, the brightness of each of the tiles obtained by virtually dividing the screen on which the image is displayed is controlled independently at a different dimming level in accordance with a difference in illuminance of the background environment (e.g., the presence/absence of direct sunlight). Accordingly, in a case where the background environment of a portion of the image is bright and the background environment of the other portion of the image is dark, it is possible to increase the dimming level (lower the transmittance) for the bright portion and to make the dimming level relatively low for the dark portion. This causes the displayed image to have uniformly closer illuminance, concentration, and the like. Providing suitable dimming levels can secure necessary sufficient visibility and can also keep the background field-of-view favorable. It can increase the visibility of the display image and can keep the background field-of-view more favorable.

II. SECOND EMBODIMENT

Hereinafter, descriptions and illustrations of configurations, operations, and the like similar to configurations, operations, and the like already described will be omitted and different points will be mainly described and illustrated.

1. Configuration of Display Dimming System

Figure 6:
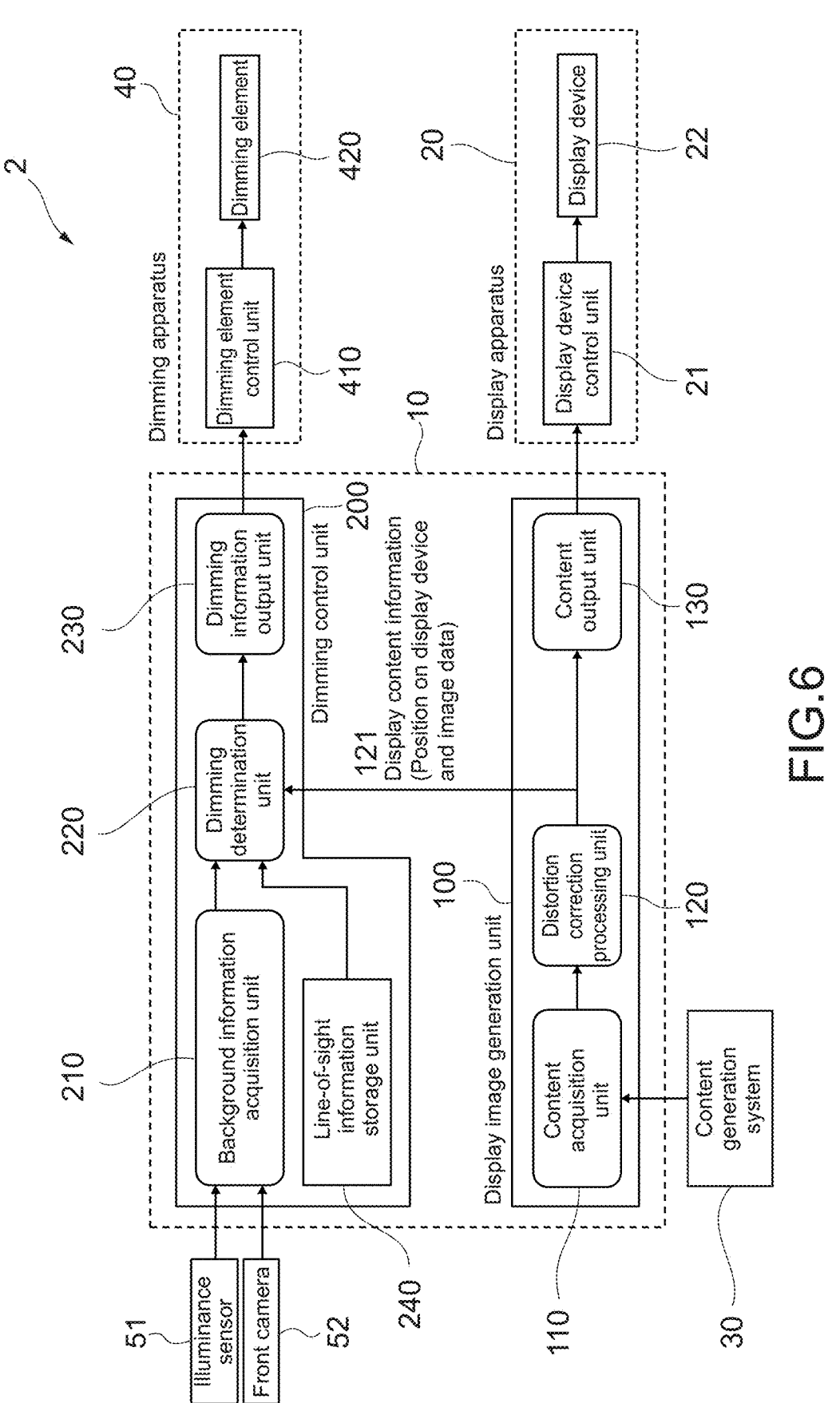
FIG. 6 A diagram showing a configuration of a display dimming system according to a second embodiment of the present disclosure.

FIG. 6 shows a configuration of a display dimming system according to a second embodiment of the present disclosure.

A background information acquisition unit 210 of the display dimming system 2 acquires an external image from a front camera 52. The dimming control unit 200 includes a line-of-sight information storage unit 240. Excluding the above-mentioned configurations, the display dimming system 2 has a configuration similar to the configuration of the display dimming system 1 according to the first embodiment.

Figure 7:
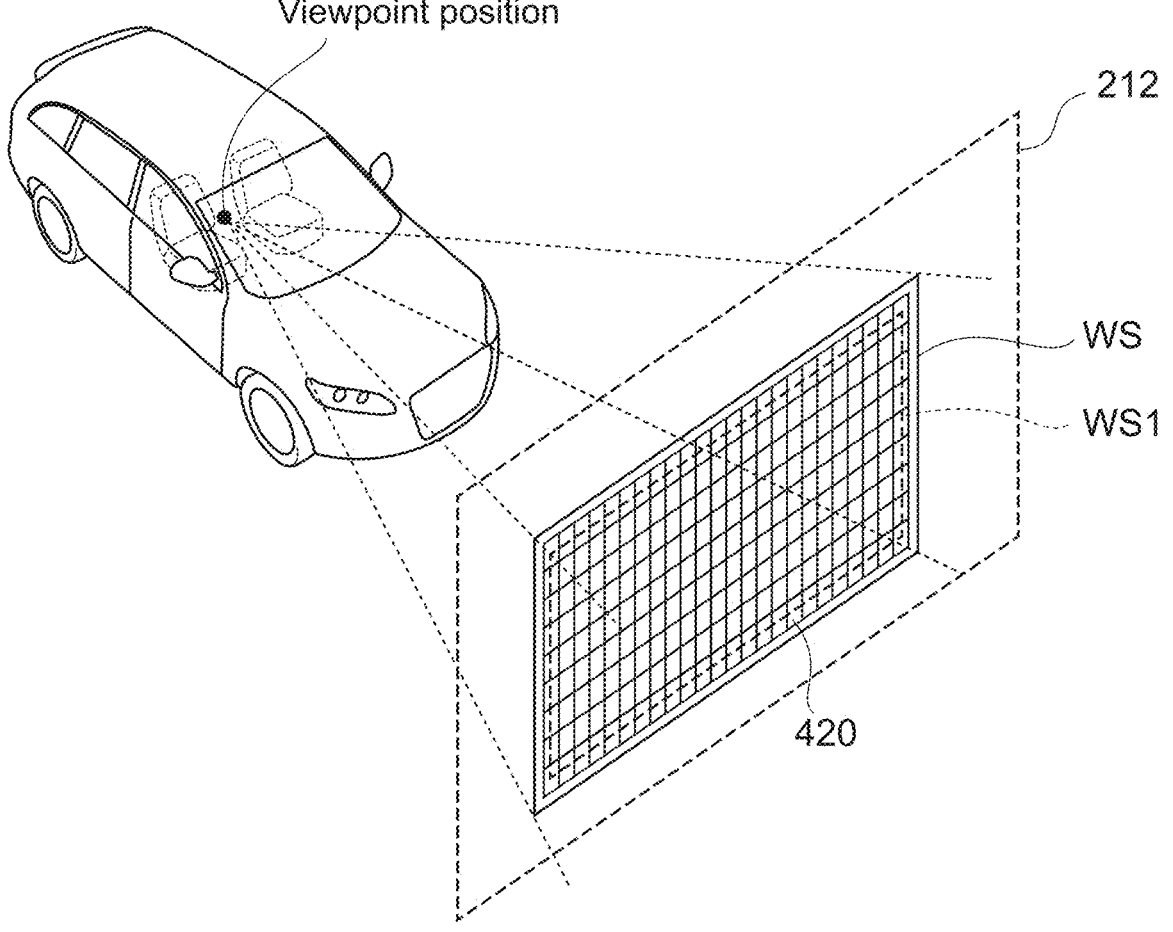
FIG. 7 A diagram schematically showing a display dimming control method.

FIG. 7 schematically shows a display dimming control method.

The background information acquisition unit 210 acquires an external image 212 captured by the front camera 52 (camera that images the external environment in the front of the vehicle). The external image 212 is an image of the background environment of the windshield WS (screen) (the external environment in the front of the vehicle). The dimming determination unit 220 determines a dimming level for each of the dimming elements 420 also on the basis of information about color of the background environment (background color information) and information about luminance of the background environment (background luminance information) included in the external image 212 as information about the background environment of the screen (background information).

2. Operation of Display Dimming System

Figure 8:
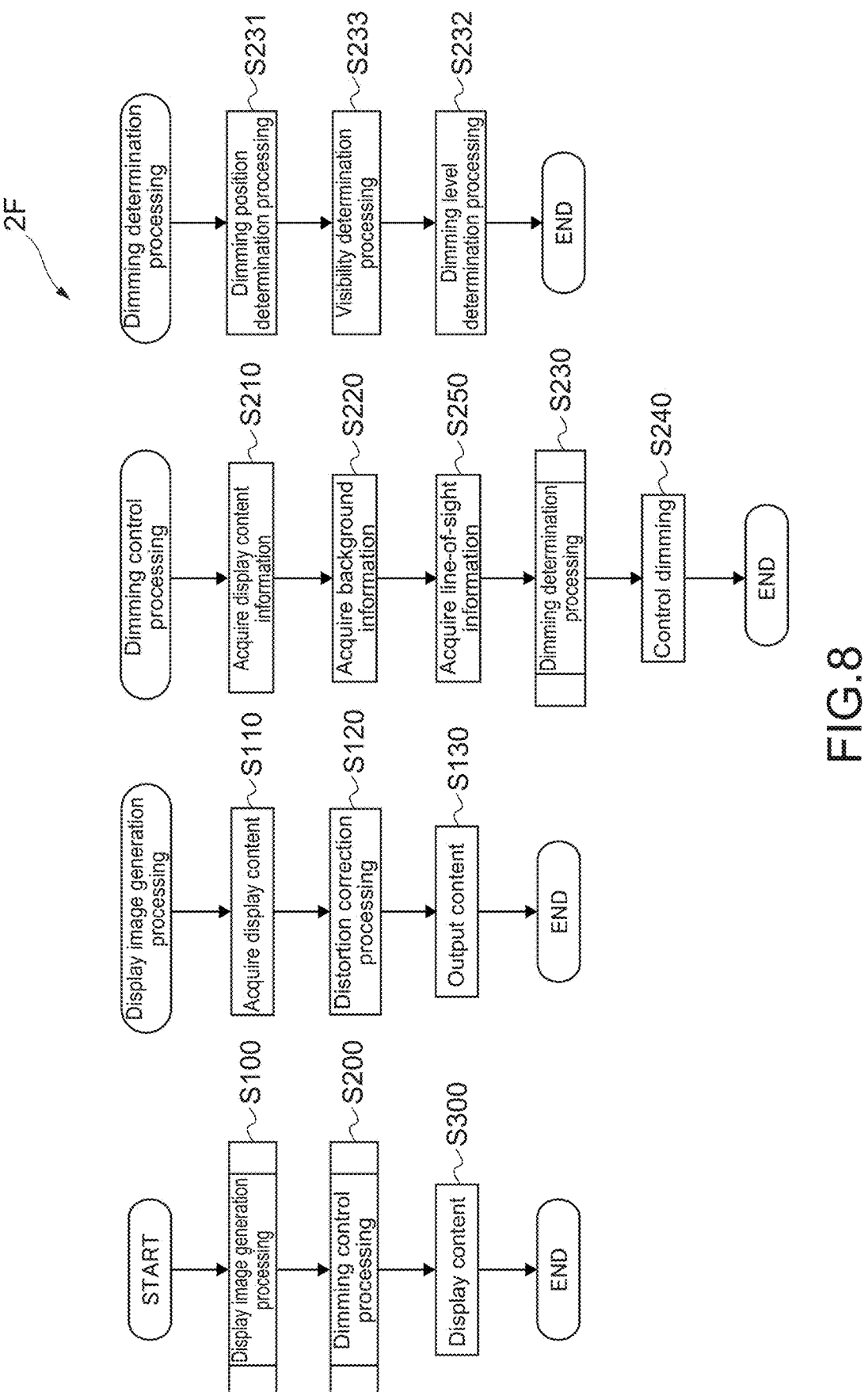
FIG. 8 A diagram showing an operation flow of the display dimming system.

FIG. 8 shows an operation flow of the display dimming system.

As to a specific method of the dimming control processing (Step S200), an operation flow 2F of the display dimming system differs from the operation flow 1F (FIG. 4) of the display dimming system according to the first embodiment. Hereinafter, the dimming control processing will be described.

The dimming determination unit 220 of the dimming control unit 200 acquires display content information 121 (image data, display device position) from the display image generation unit 100 (Step S210 which is the same as the first embodiment).

The background information acquisition unit 210 of the dimming control unit 200 acquires information (background information) about the background environment of the windshield (screen) (Step S220). Specifically, the background information acquisition unit 210 acquires illuminance information 211 from the illuminance sensor 51 as background information. The background information acquisition unit 210 further acquires an external image 212 from the front camera 52. The external image 212 is an image of the background environment of the screen (external environment in the front of the vehicle).

Figure 9:
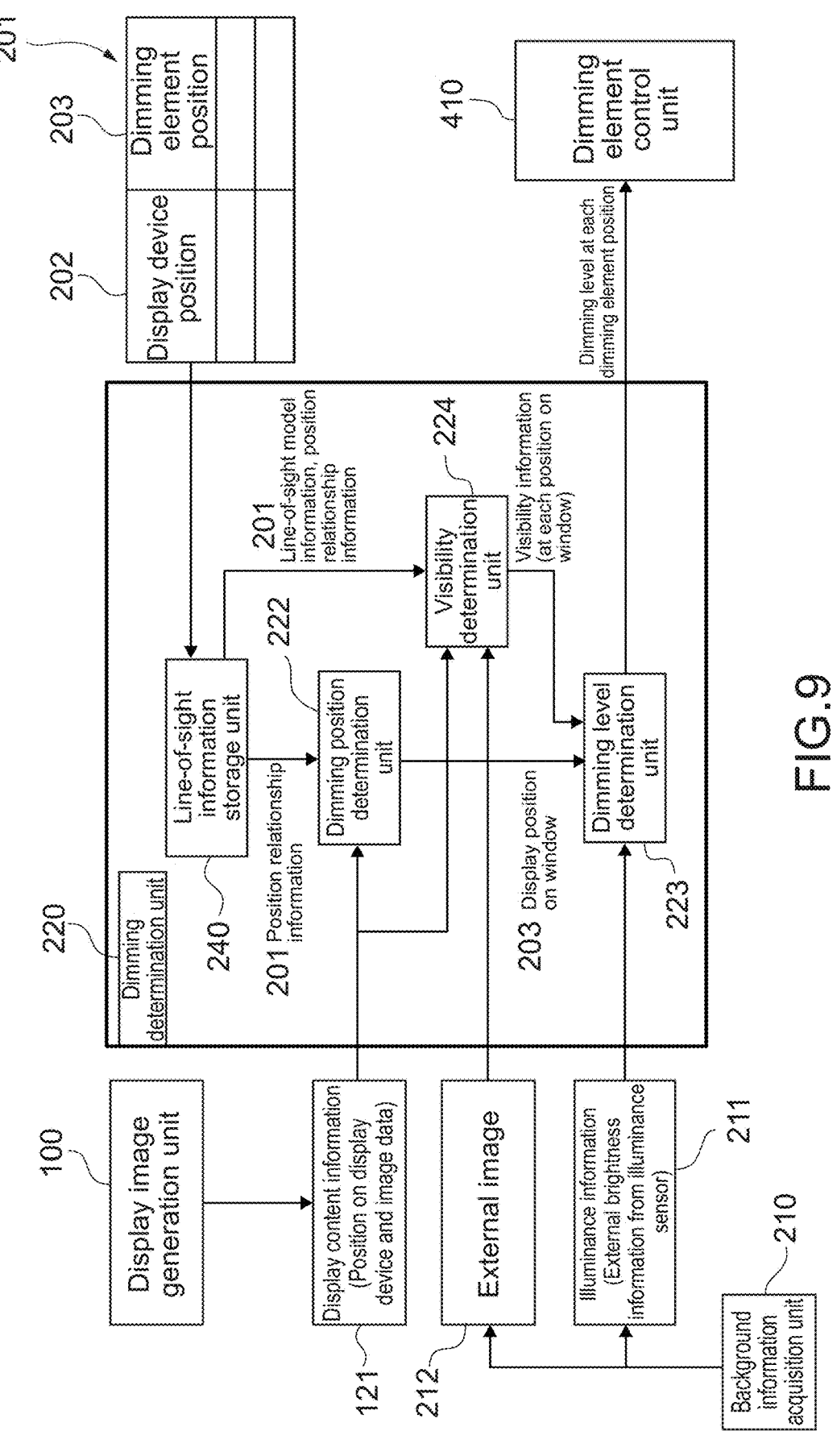
FIG. 9 A diagram showing functional configurations of a dimming determination unit.

FIG. 9 shows functional configurations of the dimming determination unit.

The line-of-sight information storage unit 240 of the dimming determination unit 220 stores line-of-sight model information and position relationship information 201. The position relationship information 201 is information for converting the display device position 202 into a dimming element position 203 (which is the same as the first embodiment).

The dimming position determination unit 222 of the dimming determination unit 220 refers to the line-of-sight information storage unit 240 and acquires the line-of-sight model information (Step S250). Assuming that a viewer (e.g., a driver) who has an average body shape views image light emitted to the screen from the display device position 202 from average eyes positions, the line-of-sight model information is information indicating a line-of-sight of the viewer.

The dimming position determination unit 222 of the dimming determination unit 220 refers to the position relationship information 201 of the line-of-sight information storage unit 240 and converts the display device position 202 (included in the display content information 121 acquired from the display image generation unit 100) into the dimming element position 203. Accordingly, the dimming position determination unit 222 determines one or more dimming elements 420 that control the dimming levels (Step S231).

A visibility determination unit 224 of the dimming determination unit 220 determines visibility of the image displayed on the screen. Specifically, the visibility determination unit 224 determines visibility for each of tiles of the image displayed on the screen (tiles obtained by virtually dividing the screen) (Step S233). The visibility determination unit 224 acquires the display content information 121 (image data of content, display device position), the external image 212, the line-of-sight model information, and the position relationship information 201. The visibility determination unit 224 determines visibility of the image when the viewer views an image displayed at a screen display position based on the position relationship information 201 in a line-of-sight based on the line-of-sight model information. The visibility determination unit 224 determines background color information (color of the background environment for each tile) and background luminance information (luminance of the background environment for each tile) for each of the tiles corresponding to the screen display position from the external image 212. The visibility determination unit 224 determines information about the color (image color information) and information about the luminance (image luminance information) of the image of the content displayed at each of the tiles corresponding to the screen display position. The visibility determination unit 224 determines contrast (chrominance contrast) between the background color information and the image color information for each tile and contrast (luminance contrast) between the background luminance information and the image luminance information for each tile, as the visibility of the image for each tile. Specifically, the "chrominance contrast=the image chrominance/the chrominance of the background environment" can be calculated. Similarly, the "luminance contrast=the image luminance/the background environment luminance" can be calculated.

The dimming level determination unit 223 of the dimming determination unit 220 acquires illuminance information 211 from the background information acquisition unit 210. The dimming level determination unit 223 acquires visibility information (chrominance contrast, luminance contrast) for each tile from the visibility determination unit 224. The dimming level determination unit 223 acquires position information of the one or more dimming elements 420 that control the dimming levels from the dimming position determination unit 222. The dimming level determination unit 223 independently determines a dimming level for each of the dimming elements 420 on the basis of the background information (illuminance information 211) and the visibility information (chrominance contrast, luminance contrast) of each of the tiles corresponding to the dimming elements 420 (Step S232).

It is sufficient that the dimming level determination unit 223 does not principally control the brightness for example in a case where the level of the illuminance of the background is low (dark), and that the dimming level determination unit 223 determines to control the brightness and determines a dimming level for each tile in a case where the color of the displayed image is dark (the luminance contrast is small). It is sufficient that the dimming level determination unit 223 does not control the brightness in a case where the level of the illuminance of the background is middle, and that the dimming level determination unit 223 determines to control the brightness and determines a dimming level for each tile in a case where the color of the external image 212 and the color of the image are similar (the chrominance contrast is small). It is sufficient that the dimming level determination unit 223 principally determines to control the brightness and determines a dimming level for each tile in a case where the level of the illuminance of the background is high (bright).

Figure 10:
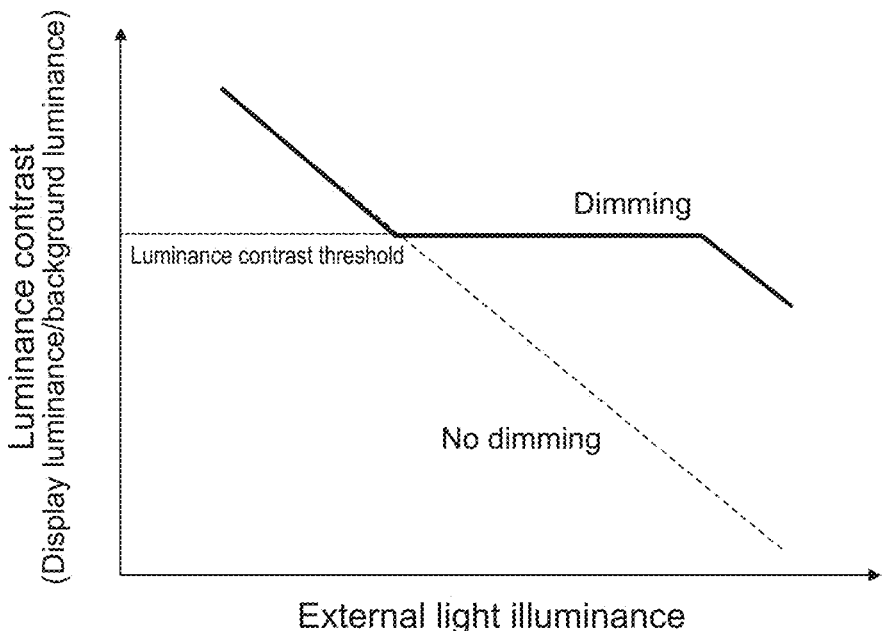
FIG. 10 A diagram schematically showing processing of a dimming level determination unit.

FIG. 10 schematically shows processing of the dimming level determination unit.

For example, it is sufficient that the dimming level determination unit 223 determines to control the brightness in a case where the luminance contrast (the displayed-image luminance/the background environment luminance) is a predetermined threshold or less, and determines whether or not to control the brightness and a dimming level in accordance with the illuminance of the background (external light illuminance).

The dimming determination unit 220 of the dimming control unit 200 independently determines a dimming level for each of the plurality of dimming elements 420 as described above (Step S230). The dimming information output unit 230 outputs the dimming level for each of the plurality of dimming elements 420 to the dimming apparatus 40 (Step S240 which is the same as the first embodiment).

As described above, in accordance with the second embodiment, the visibility of the image (chrominance contrast, luminance contrast) based on the average line-of-sight position of the viewer is determined. The brightness of each of the tiles obtained by virtually dividing the screen on which the image is displayed is controlled independently at a different dimming level in accordance with the visibility of the image as well as the difference in illuminance of the background environment (e.g., the presence/absence of direct sunlight). Accordingly, in accordance with the visibility, it is possible to increase the dimming level (lower the transmittance) for a portion (with a low contrast) where the chrominance and luminance of the image are close to the chrominance and luminance of the background environment and to make the dimming level relatively low for a portion (with a high contrast) where a difference between the chrominance and luminance of the image and the chrominance and luminance of the background environment is large. Accordingly, the brightness of each of the tiles obtained by virtually dividing the screen on which the image is displayed is controlled independently at a different dimming level in accordance with the chrominance and luminance of the image. This causes the displayed image to have uniformly much closer illuminance, concentration, and the like. Providing suitable dimming levels can secure necessary sufficient visibility and can also keep the background field-of-view favorable. It can increase the visibility of the display image and can keep the background field-of-view more favorable.

III. THIRD EMBODIMENT

1. Configuration of Display Dimming System

Figure 11:
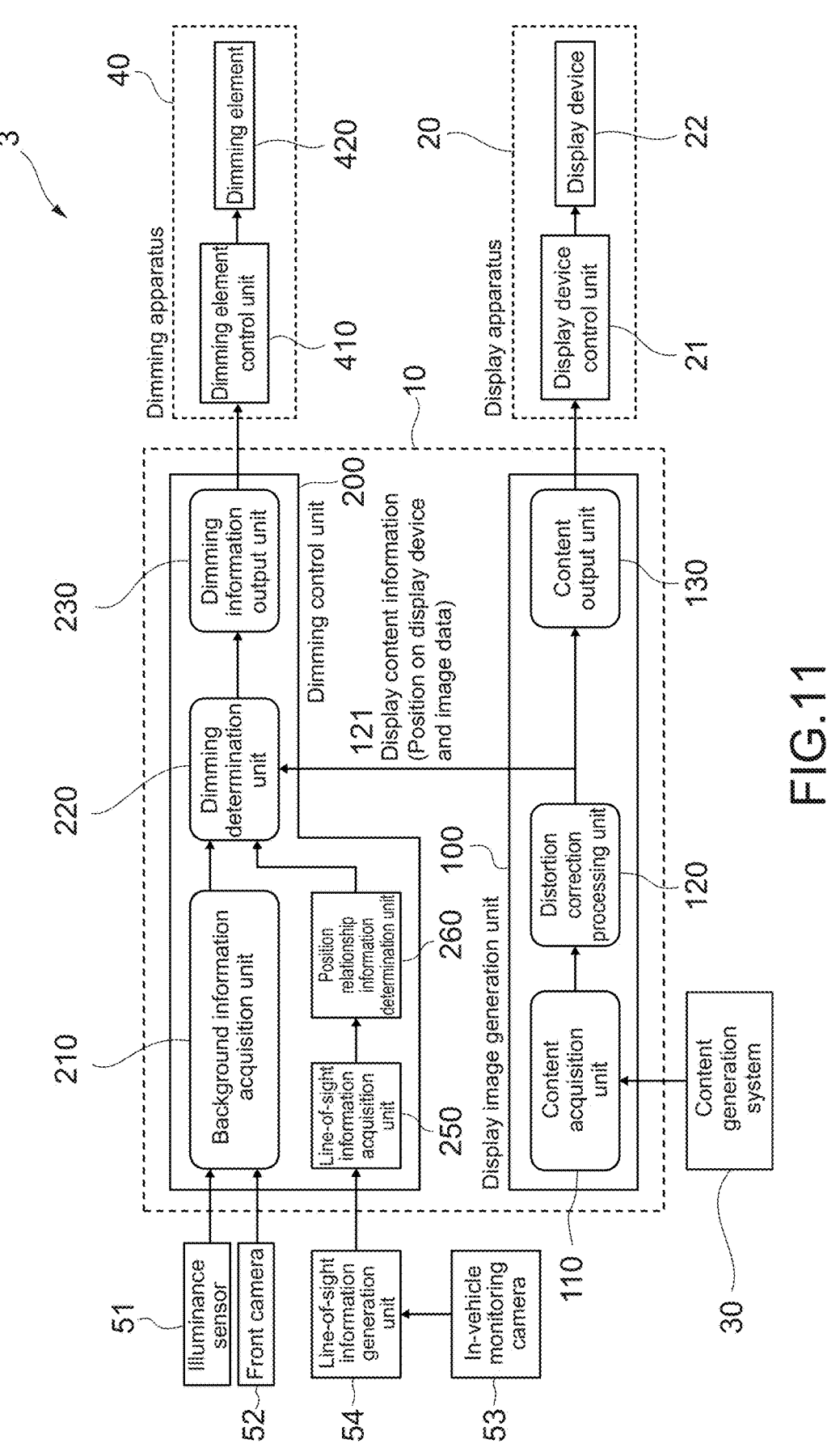
FIG. 11 A diagram showing a configuration of a display dimming system according to a third embodiment of the present disclosure.

FIG. 11 shows a configuration of a display dimming system according to a third embodiment of the present disclosure.

A dimming control unit 200 of a display dimming system 3 does not include the line-of-sight information storage unit 240. Instead, the dimming control unit 200 includes a line-of-sight information acquisition unit 250 and a position relationship information determination unit 260.

An in-vehicle monitoring camera 53 is mounted on the dashboard of the vehicle, for example. The in-vehicle monitoring camera 53 captures a viewer (typically, a driver) who views an image. The in-vehicle monitoring camera 53 outputs the captured image data to a line-of-sight information generation unit 54.

The line-of-sight information generation unit 54 acquires the captured image data from the in-vehicle monitoring camera 53. The line-of-sight information generation unit 54 generates line-of-sight information 251 of the viewer on the basis of the captured image data. The line-of-sight information 251 indicates a line-of-sight of the viewer, which is uniquely estimated on the basis of positions of the eyes of the viewer. In other words, the line-of-sight information 251 is not generated by dynamically measuring positions of the eyes of the viewer and a line-of-sight of the viewer. Dedicated hardware resources and software resources may realize the line-of-sight information generation unit 54. Alternatively, the dimming control unit 200 may realize the line-of-sight information generation unit 54 by loading a display control program recorded on a ROM to a RAM and executing the display control program by a CPU.

The line-of-sight information acquisition unit 250 acquires line-of-sight information 251 generated by the line-of-sight information generation unit 54 (uniquely estimated line-of-sight of the viewer).

The position relationship information determination unit 260 generates position relationship information on the basis of the line-of-sight information 251. In the first embodiment and the second embodiment, the single piece of position relationship information 201 based on the line-of-sight of the average viewer is constantly used. In contrast, in the third embodiment, the position relationship information determination unit 260 generates position relationship information on the basis of line-of-sight information 251 of an individual viewer.

Excluding the above-mentioned configurations, the display dimming system 3 has a configuration similar to the configuration of the display dimming system 2 according to the second embodiment.

2. Operation of Display Dimming System

Figure 12:
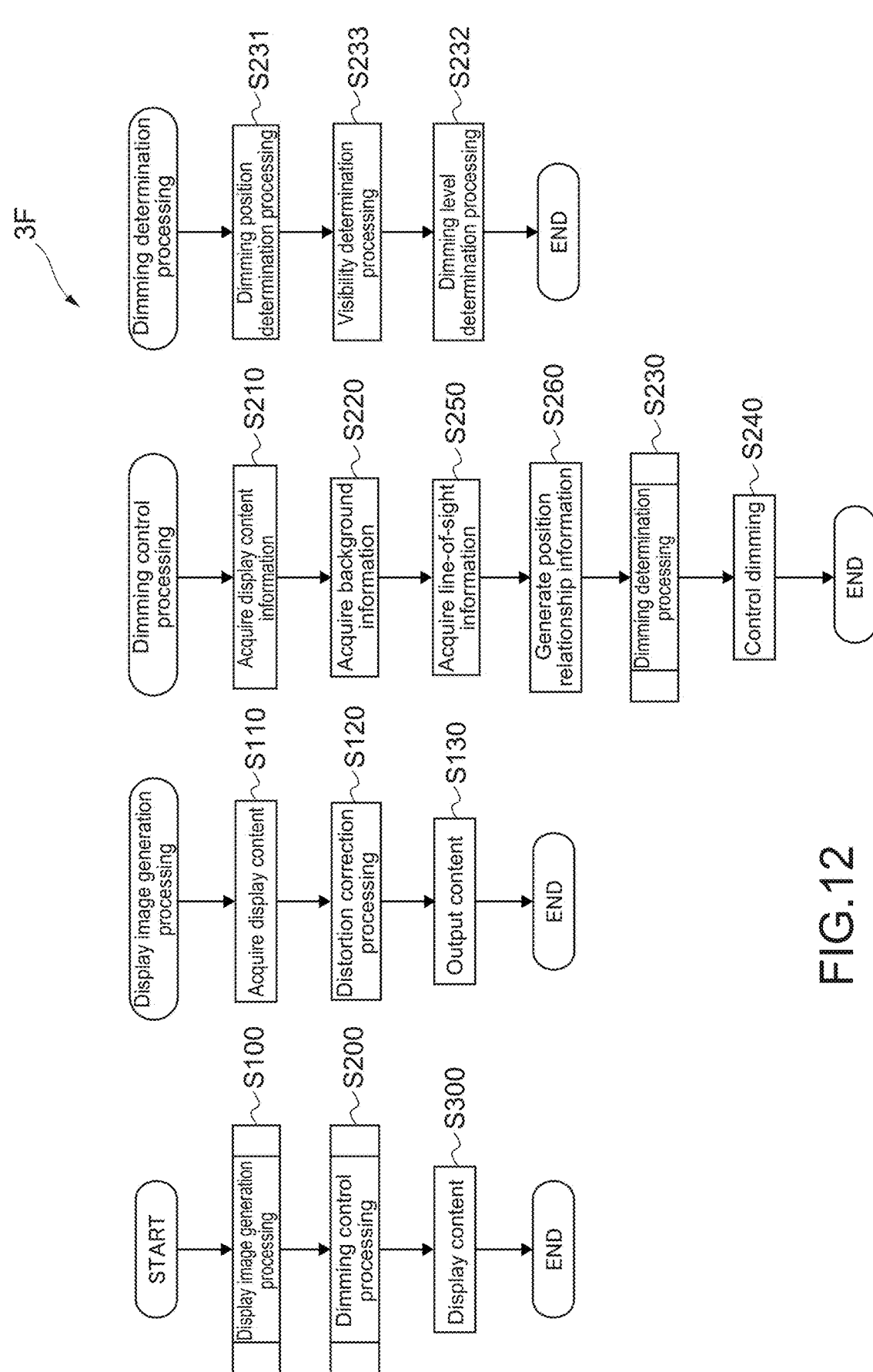
FIG. 12 A diagram showing an operation flow of the display dimming system.

FIG. 12 shows an operation flow of the display dimming system.

As to a specific method of the dimming control processing (Step S200), an operation flow 3F of the display dimming system differs from the operation flow 2F (FIG. 8) of the display dimming system according to the second embodiment. Hereinafter, the dimming control processing will be described.

The dimming determination unit 220 of the dimming control unit 200 acquires display content information 121 (image data, display device position) from the display image generation unit 100 (Step S210 which is the same as the second embodiment).

The background information acquisition unit 210 of the dimming control unit 200 acquires information (background information) about the background environment of the windshield (screen) (Step S220 which is the same as the second embodiment). Specifically, the background information acquisition unit 210 acquires illuminance information 211 from the illuminance sensor 51 as background information. The background information acquisition unit 210 further acquires an external image 212 from the front camera 52.

The line-of-sight information acquisition unit 250 acquires line-of-sight information 251 generated by the line-of-sight information generation unit 54 (uniquely estimated line-of-sight of the viewer) (Step S250).

Figure 13:
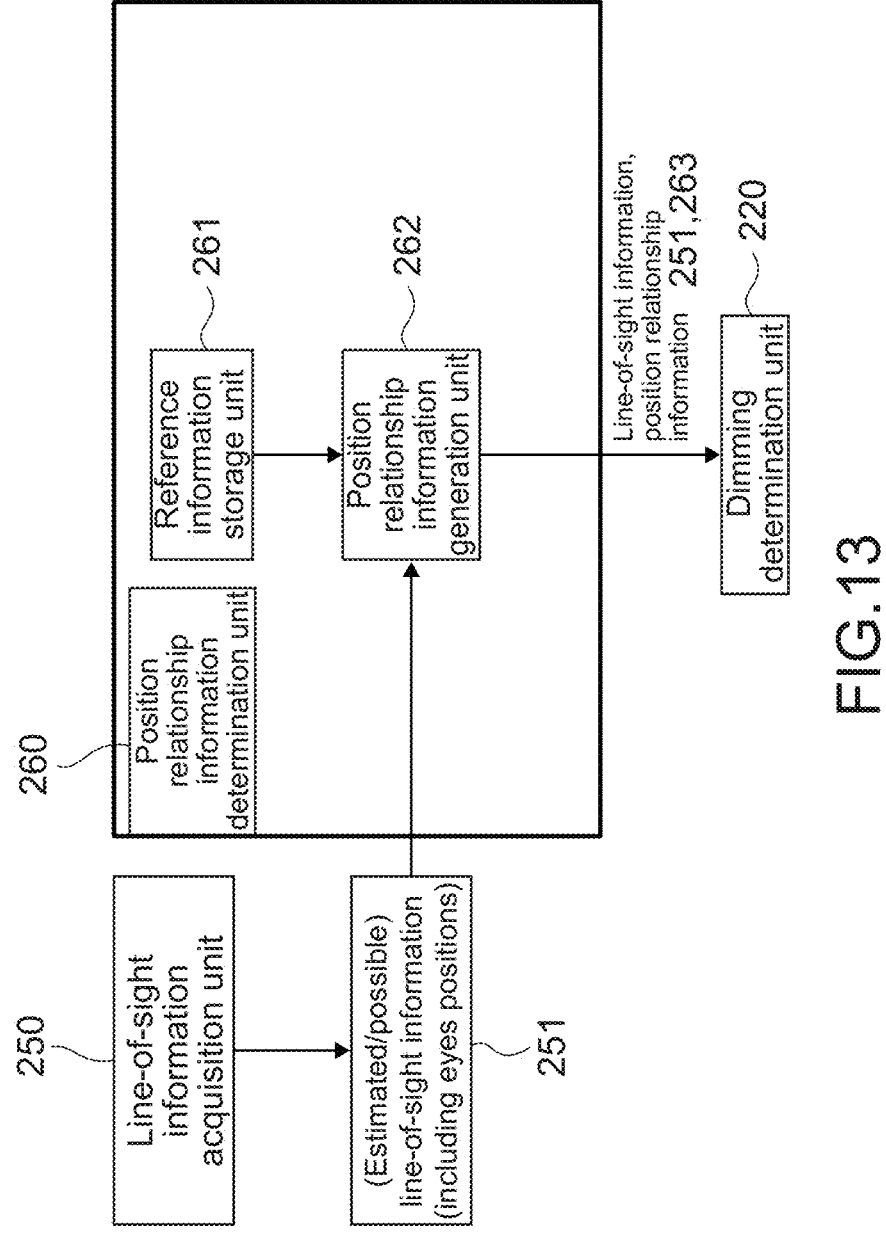
FIG. 13 A diagram showing functional configurations of a position relationship information determination unit.

FIG. 13 shows functional configurations of the position relationship information determination unit.

A reference information storage unit 261 of the position relationship information determination unit 260 stores reference information. The reference information is information used for generating position relationship information (information for converting the display device position 202 into a position 203 of the dimming element like the position relationship information 201 according to the first embodiment). As a first example of the reference information, the reference information storage unit 261 stores a plurality of pieces of position relationship information 201 (the same format as the lookup table of FIG. 5) respectively corresponding to different pieces of line-of-sight information (variations in line-of-sight). For example, it is sufficient that the reference information storage unit 261 stores the plurality of different pieces of position relationship information 201 depending on differences of the seat of and body shape of the viewer. Specifically, it is sufficient that the reference information storage unit 261 stores 3×3×3 (height×front and back×left and right)=27 pieces of position relationship information 201 that each correspond to different pieces of line-of-sight information depending on positions of different eyes of the viewer sitting on the driver's seat or the front passenger's seat. Three positions in left and right directions may be the driver's seat, the front passenger's seat, and the middle between the driver's seat and the front passenger's seat (a virtual viewer position when two people, the viewer on the driver's seat and the viewer on the front passenger's seat, view the image). It is sufficient that as a second example of the reference information, the reference information storage unit 261 stores position relationship information for converting the display device position 202 (coordinates of the micro-LED) into a dimming element position 203 (coordinates) in a three-dimensional space (curved surface of the screen).

A position relationship information generation unit 262 of the position relationship information determination unit 260 generates position relationship information 263 (like the position relationship information 201 according to the first embodiment, information for converting the display device position 202 into a position 203 of the dimming element) on the basis of the line-of-sight information 251 (uniquely estimated line-of-sight of the viewer) and the reference information stored in the reference information storage unit 261 (Step S260). It is sufficient that in the above-mentioned first example, the position relationship information generation unit 262 determines position relationship information 263 by reading a piece of position relationship information 201 closest to the line-of-sight information 251 from the 27 pieces of position relationship information 201. It is sufficient that in a case where no position relationship information 201 is close to the line-of-sight information 251, the position relationship information generation unit 262 generates position relationship information 263 with a distance-based weighted mean using the plurality of pieces of position relationship information 201. It is sufficient that in the above-mentioned second example, the position relationship information generation unit 262 generates position relationship information 263 for converting the display device position 202 into a dimming element position 203 in accordance with the line-of-sight information 251 and the dimming element position 203 (coordinates) in a three-dimensional space (curved surface of the screen).

Figure 14:
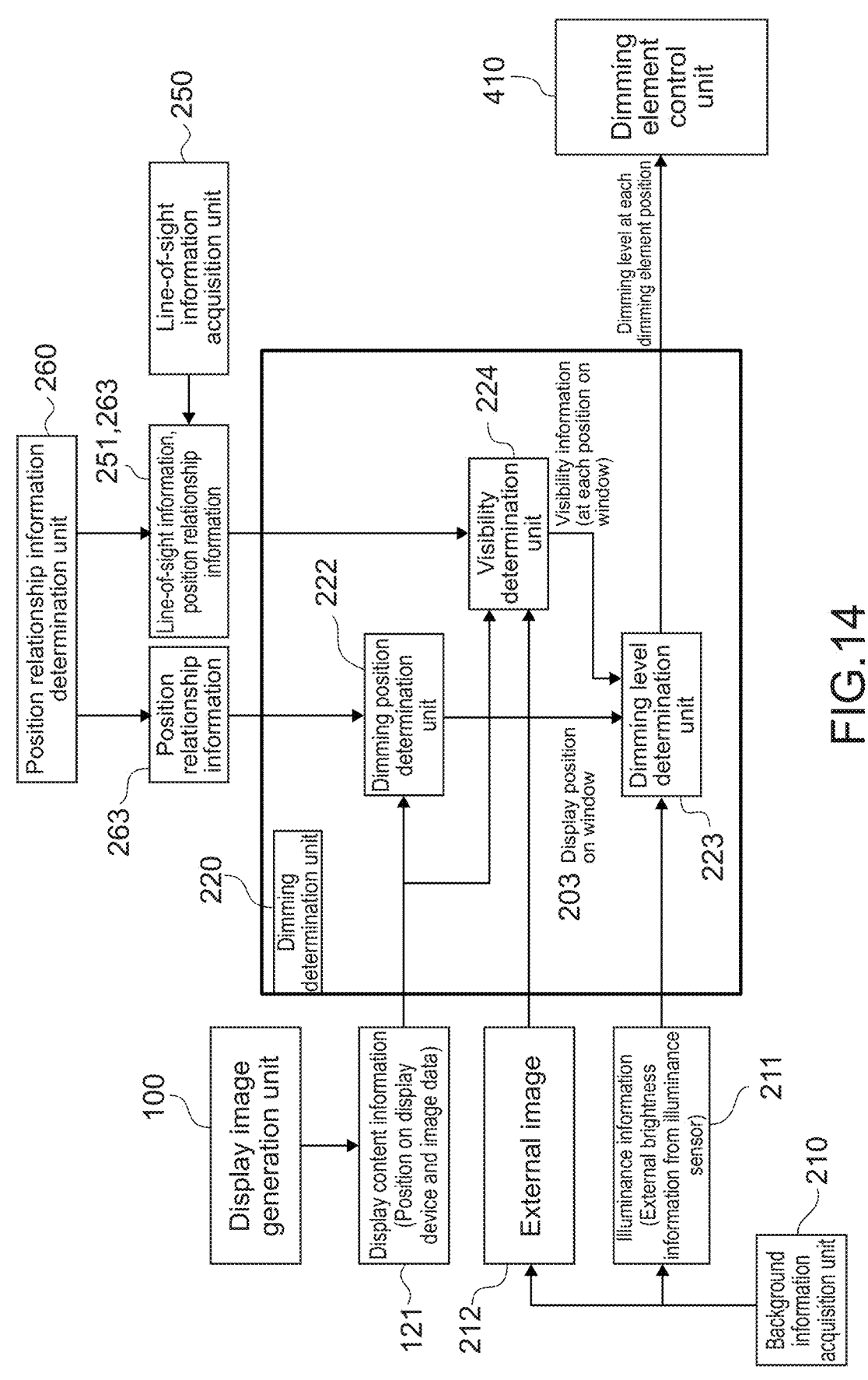
FIG. 14 A diagram showing functional configurations of a dimming determination unit.

FIG. 14 shows functional configurations of the dimming determination unit.

The dimming position determination unit 222 of the dimming determination unit 220 acquires position relationship information 263 generated by the position relationship information generation unit 262 of the position relationship information determination unit 260. The dimming position determination unit 222 refers to the position relationship information 263 and converts the display device position 202 (included in the display content information 121 acquired from the position determination unit 222 determines one or more dimming elements 420 that control the dimming levels (Step S231).

The visibility determination unit 224 of the dimming determination unit 220 determines visibility of the image displayed on the screen. Specifically, the visibility determination unit 224 determines visibility for each of tiles of the image displayed on the screen (tiles obtained by virtually dividing the screen) (Step S233). The visibility determination unit 224 acquires display content information 121 (image data of content, display device position), an external image 212, line-of-sight information 251, and position relationship information 263. The visibility determination unit 224 determines visibility of the image (chrominance contrast, luminance contrast) when the viewer views an image displayed at the screen display position based on the position relationship information 263 in the line-of-sight based on the line-of-sight information 251.

The dimming level determination unit 223 of the dimming determination unit 220 acquires illuminance information 211 from the background information acquisition unit 210. The dimming level determination unit 223 acquires visibility information (chrominance contrast, luminance contrast) for each tile from the visibility determination unit 224. The dimming level determination unit 223 acquires position information of the one or more dimming elements 420 that control the dimming levels from the dimming position determination unit 222. The dimming level determination unit 223 independently determines a dimming level for each of the dimming elements 420 on the basis of the background information (illuminance information 211) and the visibility information (chrominance contrast, luminance contrast) of each of the tiles corresponding to the dimming elements 420 (Step S232 which is the same as the second embodiment).

The dimming determination unit 220 of the dimming control unit 200 independently determines a dimming level for each of the plurality of dimming elements 420 as described above (Step S230). The dimming information output unit 230 outputs the dimming level for each of the plurality of dimming elements 420 to the dimming apparatus 40 (Step S240 which is the same as the second embodiment).

As described above, in accordance with the third embodiment, a screen display position (position on the screen on which the image is displayed) that is a dimming target is determined on the basis of the estimated line-of-sight position of the individual viewer. This increases the possibility that the brightness of the image that the viewer views is controlled. Moreover, in accordance with the third embodiment, visibility of the image (estimated visibility of the individual viewer) when viewing the image in the estimated line-of-sight of the individual viewer is determined. The brightness of each of the tiles obtained by virtually dividing the screen on which the image is displayed is controlled independently at a different dimming level in accordance with the estimated visibility of the image of the individual viewer. It can increase the visibility of the display image for the individual viewer and can keep the background field-of-view more favorable as compared to a case of determining a dimming level simply in accordance with visibility for a viewer (model) who has an average body shape.

IV. FOURTH EMBODIMENT

1. Configuration of Display Dimming System

Figure 15:
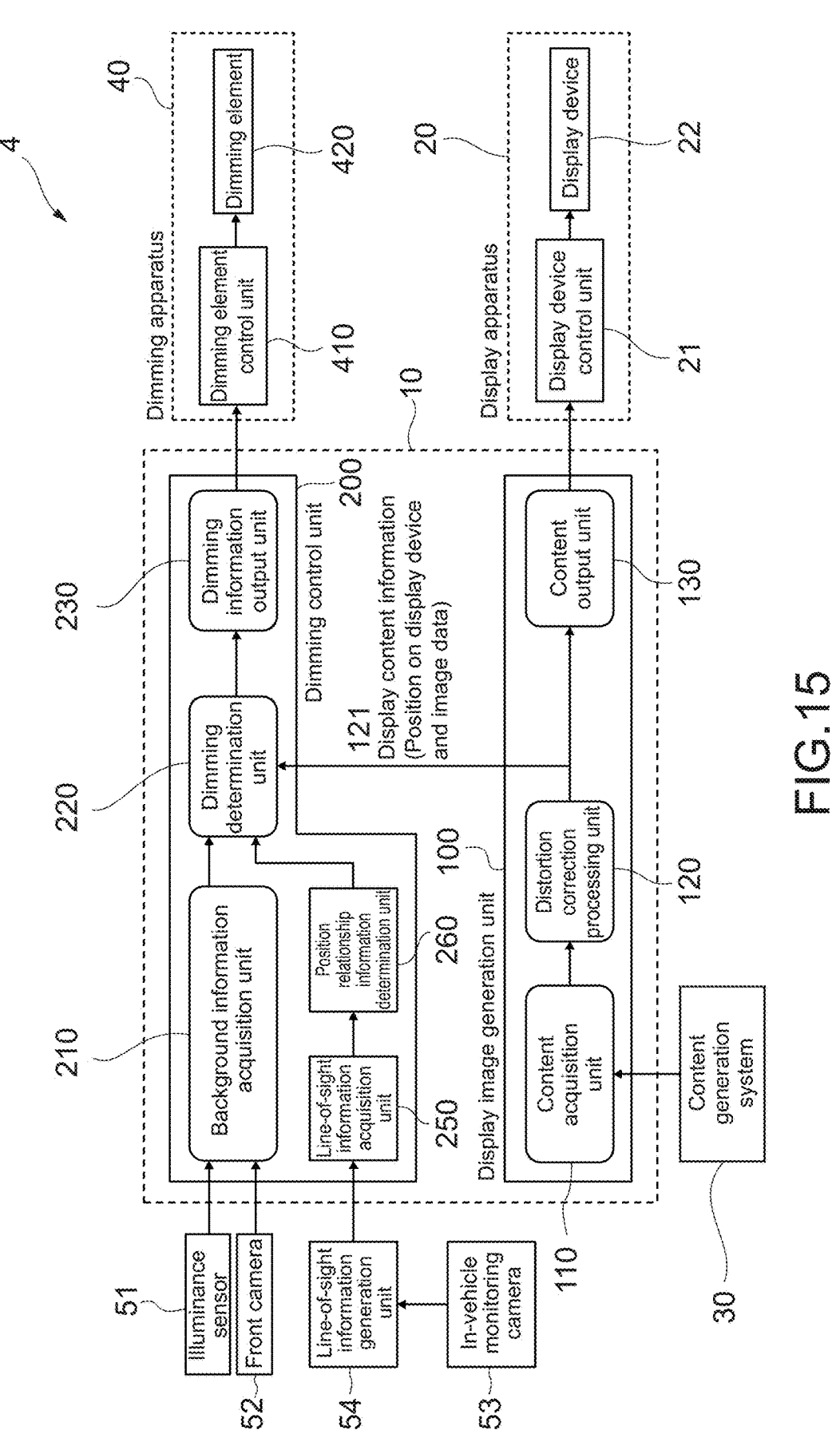
FIG. 15 A diagram showing a configuration of a display dimming system according to a fourth embodiment of the present disclosure.

FIG. 15 shows a configuration of a display dimming system according to a fourth embodiment of the present disclosure.

A line-of-sight information generation unit 54 generates line-of-sight information 252 of the viewer on the basis of image data captured from the in-vehicle monitoring camera 53. The line-of-sight information 252 indicates a line-of-sight of the viewer generated by dynamically measuring positions of the eyes of the viewer and a line-of-sight of the viewer. In other words, the line-of-sight information 252 is a line-of-sight of the viewer that dynamically changes at each moment unlike the line-of-sight information 251 (uniquely estimated line-of-sight of the viewer). The line-of-sight information generation unit 54 further generates viewpoint position information 253 on the basis of the line-of-sight information 252 of the viewer. The viewpoint position information 253 indicates the viewer's viewpoint on the screen that dynamically changes at each moment.

The position relationship information determination unit 260 generates position relationship information 264 on the basis of the line-of-sight information 252 (line-of-sight of the viewer that dynamically changes). In the third embodiment, the position relationship information determination unit 260 generates the position relationship information 263 on the basis of the line-of-sight information 251 (uniquely estimated line-of-sight of the viewer). In contrast, in the fourth embodiment, the position relationship information determination unit 260 generates position relationship information 264 on the basis of the line-of-sight information 252 (line-of-sight of the viewer that dynamically changes).

Excluding the above-mentioned configurations, the display dimming system 4 has a configuration similar to the configuration of the display dimming system 3 according to the third embodiment.

2. Operation of Display Dimming System

FIG. 16 shows an operation flow of the display dimming system.

As to a specific method of the dimming control processing (Step S200), an operation flow 4F of the display dimming system differs from the operation flow 3F (FIG. 12) of the display dimming system according to the third embodiment. Hereinafter, the dimming control processing will be described.

The dimming determination unit 220 of the dimming control unit 200 acquires display content information 121 (image data, display device position) from the display image generation unit 100 (Step S210 which is the same as the third embodiment).

The background information acquisition unit 210 of the dimming control unit 200 acquires information (background information) about the background environment of the windshield (screen) (Step S220 which is the same as the third embodiment). Specifically, the background information acquisition unit 210 acquires illuminance information 211 from the illuminance sensor 51 as background information. The background information acquisition unit 210 further acquires an external image 212 from the front camera 52.

The line-of-sight information acquisition unit 250 acquires line-of-sight information 252 (line-of-sight of the viewer that dynamically changes) generated by the line-of-sight information generation unit 54 (Step S250).

Figure 17:
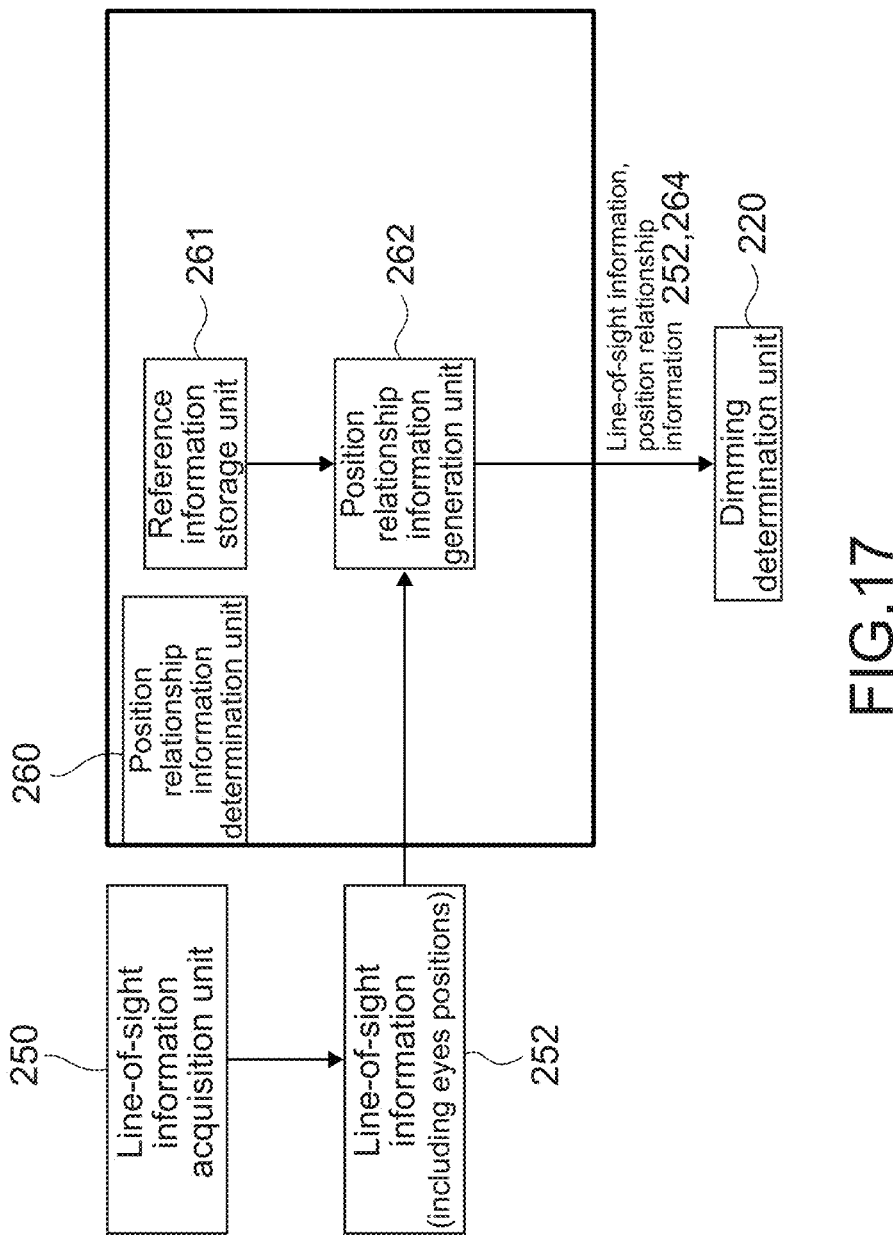
FIG. 17 A diagram showing functional configurations of a position relationship information determination unit.

FIG. 17 shows functional configurations of the position relationship information determination unit.

The position relationship information generation unit 262 of the position relationship information determination unit 260 generates position relationship information 264 (information for converting the display device position 202 into a position 203 of the dimming element, which is the same as the position relationship information 263 according to the third embodiment) on the basis of the line-of-sight information 252 (line-of-sight of the viewer that dynamically changes) and the reference information stored in the reference information storage unit 261 (the same reference information as the third embodiment) (Step S260).

In the third embodiment, the position relationship information generation unit 262 generates a single piece of position relationship information 263 on the basis of the line-of-sight information 251 (uniquely estimated line-of-sight of the viewer). In contrast, in the fourth embodiment, the position relationship information generation unit 262 generates position relationship information 264 on the basis of the line-of-sight information 252 (line-of-sight of the viewer that dynamically changes) at each moment. In other words, different position relationship information 264 is generated when for example a change in attitude of the viewer changes the line-of-sight information 252 (line-of-sight of the viewer).

Figure 18:
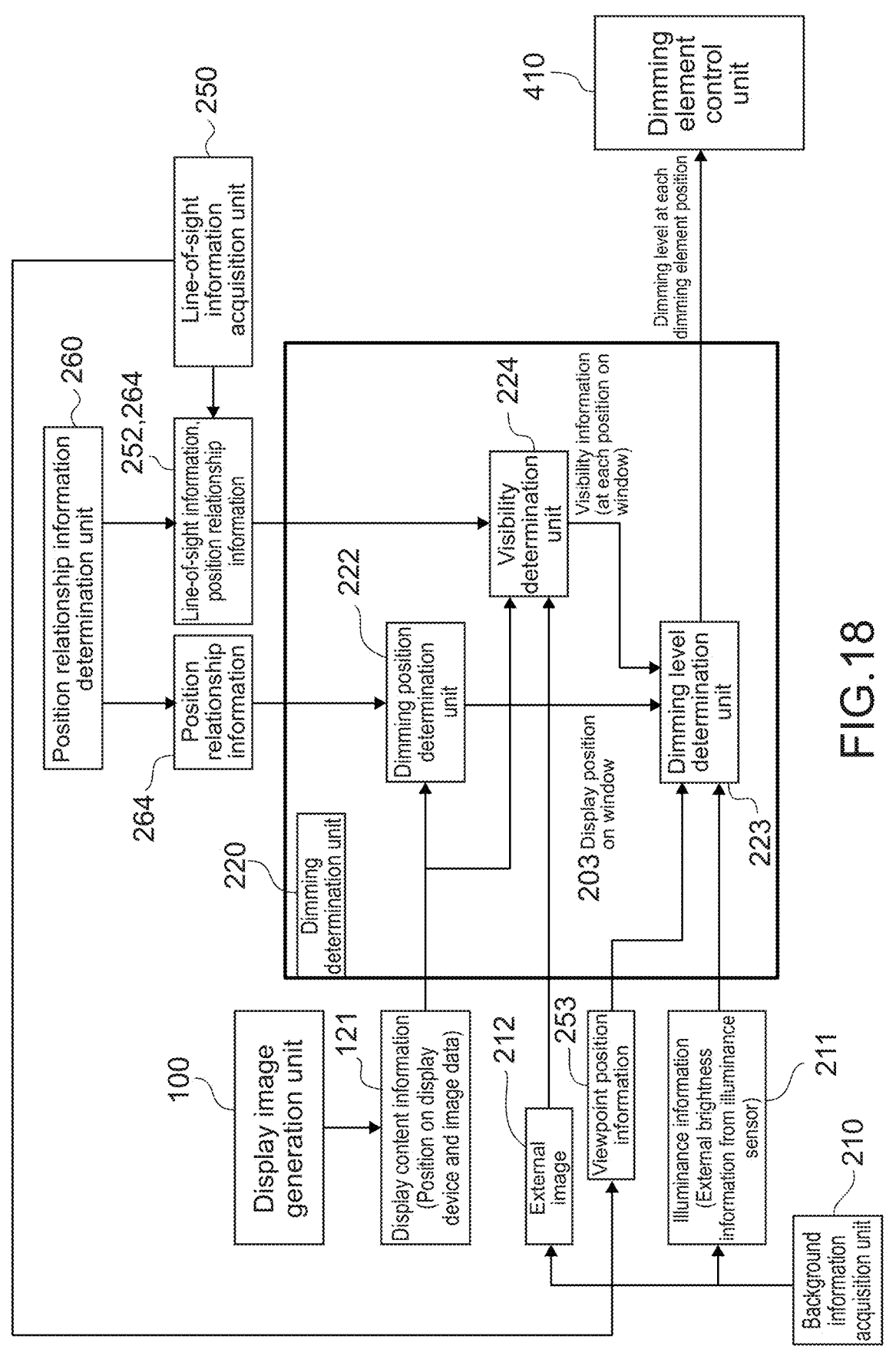
FIG. 18 A diagram showing functional configurations of a dimming determination unit.

FIG. 18 shows functional configurations of the dimming determination unit.

The dimming position determination unit 222 of the dimming determination unit 220 acquires the position relationship information 264 (that differs in accordance with the line-of-sight of the viewer that dynamically changes) generated by the position relationship information generation unit 262 of the position relationship information determination unit 260. The dimming position determination unit 222 refers to the position relationship information 264 and converts the display device position 202 (included in the display content information 121 acquired from the position determination unit 222 determines one or more dimming elements 420 that control the dimming levels (Step S231).

In the third embodiment, the dimming position determination unit 222 determines one or more dimming elements 420 that control the dimming levels on the basis of the single piece of position relationship information 263. In contrast, in the fourth embodiment, the position relationship information generation unit 262 determines one or more dimming elements 420 that control the dimming levels on the basis of the position relationship information 264 (that differs in accordance with the line-of-sight of the viewer that dynamically changes) at each moment. In other words, different one or more dimming elements 420 that control the dimming levels are determined when for example a change in attitude of the viewer changes the line-of-sight information 252 (line-of-sight of the viewer).

The visibility determination unit 224 of the dimming determination unit 220 determines visibility of the image displayed on the screen. Specifically, the visibility determination unit 224 determines visibility for each of tiles of the image displayed on the screen (tiles obtained by virtually dividing the screen) (Step S233). The visibility determination unit 224 acquires display content information 121 (image data of content, display device position), an external image 212, line-of-sight information 252 (line-of-sight of the viewer that dynamically changes), and position relationship information 264 (that differs in accordance with the line-of-sight of the viewer that dynamically changes). The visibility determination unit 224 determines visibility of the image (chrominance contrast, luminance contrast) when the viewer views an image displayed at the screen display position based on the position relationship information 264 in the line-of-sight based on the line-of-sight information 252.

The dimming level determination unit 223 of the dimming determination unit 220 acquires illuminance information 211 from the background information acquisition unit 210. The dimming level determination unit 223 of the dimming determination unit 220 acquires visibility information (chrominance contrast, luminance contrast) for each tile from the visibility determination unit 224. The dimming level determination unit 223 of the dimming determination unit 220 acquires position information of the one or more dimming elements 420 that control the dimming levels from the dimming position determination unit 222. The dimming level determination unit 223 of the dimming determination unit 220 further acquires viewpoint position information 253 from the line-of-sight information acquisition unit 250.

The dimming level determination unit 223 determines whether the viewer is currently viewing tiles corresponding to the one or more dimming elements 420 that control the dimming levels (tiles obtained by virtually dividing the screen) on the basis of the viewpoint position information 253 (viewer's viewpoint on the screen that dynamically changes at each moment).

In a case where the dimming level determination unit 223 determines that the viewer is viewing tiles corresponding to the one or more dimming elements 420 that control the dimming levels, the dimming level determination unit 223 determines dimming levels of these one or more dimming elements 420. The dimming level determination unit 223 independently determines a dimming level for each of the dimming elements 420 on the basis of the background information (illuminance information 211) and the visibility information (chrominance contrast, luminance contrast) of each of the tiles corresponding to the dimming elements 420 (Step S232).

On the other hand, when for example a change in attitude of the viewer changes the viewpoint position information 253 (viewer's viewpoint on the screen that dynamically changes at each moment), the dimming level determination unit 223 determines that the viewer is not viewing the tiles corresponding to the one or more dimming elements 420 that control the dimming levels. Then, the dimming level determination unit 223 does not control the brightness of these one or more dimming elements 420.

The dimming determination unit 220 of the dimming control unit 200 independently determines a dimming level for each of the plurality of dimming elements 420 as described above (Step S230). The dimming information output unit 230 outputs the dimming level for each of the plurality of dimming elements 420 to the dimming apparatus 40 (Step S240 which is the same as the third embodiment).

As described above, in accordance with the fourth embodiment, a screen display position (position on the screen on which the image is displayed) that is a dimming target is determined on the basis of a line-of-sight position of the viewer that dynamically changes. This constantly increases the possibility that the brightness of the image that the viewer views is controlled even when for example a change in attitude of the viewer changes the line-of-sight of the viewer. Moreover, in accordance with the fourth embodiment, visibility of the image (visibility of the individual viewer at each moment) when viewing the image in the line-of-sight of the individual viewer that changes at each moment is determined. The brightness of each of the tiles obtained by virtually dividing the screen on which the image is displayed is controlled independently at a different dimming level in accordance with the visibility of the image of the individual viewer at each moment. It constantly can increase the visibility of the display image and can keep the background field-of-view more favorable even when for example a change in attitude of the viewer changes the line-of-sight of the viewer as compared to a case of determining a dimming level in accordance with visibility based on an estimated line-of-sight of an individual viewer position. Moreover, in accordance with the fourth embodiment, the brightness of the position not viewed by the viewer is not controlled when for example a change in attitude of the viewer changes the viewer's viewpoint on the screen that dynamically changes at each moment. This reduces cases of unnecessarily controlling the brightness of the screen. It lowers the possibility that the visibility of the background environment of the screen (in particular, a position that the viewer is actually viewing) may lower.

V. CONCLUSIONS

When displaying an image on a transparent screen such as a window of a vehicle or building, brightness of an environment that is the background of the image or influences of objects may lower visibility of the image. One of measures for coping with it can be attaching to the entire surface of the screen a smoke film for reducing incident light passing through the window or a dimming film with a variable dimming level. This method uniformly reduces or controls the brightness of the entire surface of the screen. Therefore, controlling the brightness (reducing the brightness) of the screen in order to increase the visibility of the image may lower the visibility of a background environment of the screen.

In view of the above-mentioned circumstances, in accordance with each embodiment of the present disclosure, the brightness of only the screen display position at which the image is displayed is controlled and the brightness of the position at which the image on the screen is not displayed is not controlled. Accordingly, the visibility of the image increases due to the dimming, and at the same time, the visibility of the background environment of the screen does not lower. In addition, the brightness of each of the tiles obtained by virtually dividing the screen on which the image is displayed is controlled independently at a different dimming level in accordance with a difference in illuminance of the background environment (e.g., the presence/absence of direct sunlight). Accordingly, in a case where the background environment of a portion of the image is bright and the background environment of the other portion of the image is dark, it is possible to increase the dimming level (lower the transmittance) for the bright portion and to make the dimming level relatively low for the dark portion. This causes the displayed image to have uniformly closer illuminance, concentration, and the like. Providing suitable dimming levels can secure necessary sufficient visibility and can also keep the background field-of-view favorable. This can enhance the visibility of an image displayed on a transparent screen and the visibility of a background environment of the screen at the same time.

In the first to fourth embodiments, the display dimming control apparatus and the dimming apparatus are described as the display apparatus. However, one apparatus may be included in another apparatus. For example, the display dimming control apparatus may be included in the dimming apparatus. Moreover, at least one of blocks included in each apparatus may be included in another apparatus. Moreover, at least one of blocks included in each apparatus may be provided as another apparatus different from the display dimming control apparatus, the dimming apparatus, and the display apparatus.

The present disclosure can have the following configurations.

(1) A display dimming control apparatus, including:

a display image generation unit that determines a display device position that is a position of a display device that emits image light in order to display an image on a transparent screen from a display apparatus having the display device; and a dimming processing control unit that controls a dimming apparatus having a plurality of dimming elements, the plurality of dimming elements independently controlling a dimming level of the screen for each of a plurality of tiles obtained by virtually dividing the screen, the dimming processing control unit including a dimming position determination unit that determines one or more dimming elements that control dimming levels of one or more tiles corresponding to a screen display position, the screen display position being a position on the screen at which the image is displayed by image light emitted from the display device position, and a dimming level determination unit that acquires background information that is information about a background environment of the screen and independently determines a dimming level for each of the one or more dimming elements on the basis of background information of each of the one or more tiles corresponding to the one or more dimming elements.

(2) The display dimming control apparatus according to (1), in which the background information includes illuminance information that is information about illuminance of the background environment, and the dimming level determination unit independently determines the dimming level for each of the one or more dimming elements on the basis of illuminance information of each of the one or more tiles corresponding to the one or more dimming elements.

(3) The display dimming control apparatus according to (1) or (2), in which the dimming processing control unit further includes a visibility determination unit that determines visibility of each of the one or more tiles, and the dimming level determination unit independently determines, on the basis of the visibility, the dimming level for each of the one or more dimming elements.

(4) The display dimming control apparatus according to (3), in which the background information includes background color information that is information about color of the background environment, and the visibility determination unit determines the visibility of each of the one or more tiles on the basis of background color information of each of the one or more tiles corresponding to the one or more dimming elements and image color information that is information about color of an image displayed for each of the one or more tiles.

(5) The display dimming control apparatus according to (3) or (4), in which the background information includes luminance information that is information about luminance of the background environment, and the visibility determination unit determines the visibility of each of the one or more tiles on the basis of background luminance information of each of the one or more tiles corresponding to the one or more dimming elements and image luminance information that is information about luminance of an image displayed for each of the one or more tiles.

(6) The display dimming control apparatus according to any one of (3) to (5), in which the dimming processing control unit further includes a position relationship information generation unit that generates position relationship information on the basis of line-of-sight information that is information indicating a line-of-sight of a viewer who views the image, the position relationship information being information for converting the display device position into one or more dimming elements that control dimming levels of one or more tiles corresponding to a screen display position, the screen display position being a position on the screen at which the image is displayed by image light emitted from the display device position, and the dimming position determination unit determines the one or more dimming elements on the basis of the position relationship information.

(7) The display dimming control apparatus according to (6), in which the visibility determination unit determines the visibility also on the basis of line-of-sight information and the position relationship information, the line-of-sight information being information indicating a line-of-sight of a viewer who views the image.

(8) The display dimming control apparatus according to (6) or (7), in which the line-of-sight information is estimated on the basis of positions of eyes of the viewer.

(9) The display dimming control apparatus according to (6) or (7), in which the line-of-sight information is generated by dynamically measuring positions of eyes of the viewer and a line-of-sight of the viewer.

(10) The display dimming control apparatus according to (9), in which the dimming level determination unit determines not to control dimming of one or more dimming elements corresponding to the screen display position when the dimming level determination unit determines that the viewer is not viewing the screen display position on the basis of the line-of-sight information.

(11) The display dimming control apparatus according to any one of (1) to (10), in which the screen has a freeform curved surface.

(12) The display dimming control apparatus according to any one of (1) to (11), in which the screen is a windshield of a vehicle.

(13) The display dimming control apparatus according to (12), in which the display apparatus is a projection apparatus capable of projecting the image on an entire region in a width-wise direction of the windshield.

(14) The display dimming control apparatus according to any one of (1) to (10), in which the screen is a window of a vehicle.

(16) A display dimming control method, including:

determining a display device position that is a position of a display device that emits image light in order to display an image on a transparent screen from a display apparatus having the display device;

controlling a dimming apparatus having a plurality of dimming elements, the plurality of dimming elements independently controlling a dimming level of the screen for each of a plurality of tiles obtained by virtually dividing the screen;

determining one or more dimming elements that control dimming levels of one or more tiles corresponding to a screen display position, the screen display position being a position on the screen at which the image is displayed by image light emitted from the display device position; and acquiring background information that is information about a background environment of the screen and independently determines a dimming level for each of the one or more dimming elements on the basis of background information of each of the one or more tiles corresponding to the one or more dimming elements.

(17) A non-transitory computer-readable recording medium recording a display dimming control program that causes a dimming processing control unit of a display dimming control apparatus including a display image generation unit that determines a display device position that is a position of a display device that emits image light in order to display an image on a transparent screen from a display apparatus having the display device, and the dimming processing control unit that controls a dimming apparatus having a plurality of dimming elements, the plurality of dimming elements independently controlling a dimming level of the screen for each of a plurality of tiles obtained by virtually dividing the screen, to operate as:

a dimming position determination unit that determines one or more dimming elements that control dimming levels of one or more tiles corresponding to a screen display position, the screen display position being a position on the screen at which the image is displayed by image light emitted from the display device position; and a dimming level determination unit that acquires background information that is information about a background environment of the screen and independently determines a dimming level for each of the one or more dimming elements on the basis of background information of each of the one or more tiles corresponding to the one or more dimming elements.

(18) A display dimming system, including:

a display apparatus that has a display device and displays an image on a transparent screen;

a dimming apparatus having a plurality of dimming elements, the plurality of dimming elements independently controlling a dimming level of the screen for each of a plurality of tiles obtained by virtually dividing the screen; and a display dimming control apparatus including a display image generation unit that determines a display device position that is a position of a display device that emits image light in order to display an image on the screen from the display apparatus, and a dimming processing control unit including a dimming position determination unit that determines one or more dimming elements that control dimming levels of one or more tiles corresponding to a screen display position, the screen display position being a position on the screen at which the image is displayed by image light emitted from the display device position, and a dimming level determination unit that acquires background information that is information about a background environment of the screen and independently determines a dimming level for each of the one or more dimming elements on the basis of background information of each of the one or more tiles corresponding to the one or more dimming elements, the display dimming control apparatus controlling the dimming apparatus.

Although the embodiments and modified examples of the present technology are described hereinabove, it should be understood that the present technology is not limited to those embodiments and various modifications can be made without departing from the gist of the present technology.

REFERENCE SIGNS LIST 1, 2, 3, 4 display dimming system
10 display dimming control apparatus
100 display image generation unit
110 content acquisition unit
120 distortion correction processing unit
121 display content information
130 content output unit
20 display apparatus
200 dimming control unit
201 position relationship information
202 display device position
203 dimming element position
21 display device control unit
210 background information acquisition unit
211 illuminance information
212 external image
22 display device
220 dimming determination unit
221 position relationship information storage unit
222 dimming position determination unit
223 dimming level determination unit
224 visibility determination unit
230 dimming information output unit
240 line-of-sight information storage unit
250 line-of-sight information acquisition unit
251 line-of-sight information
252 line-of-sight information
260 position relationship information determination unit
261 reference information storage unit
262 position relationship information generation unit
263 position relationship information
264 position relationship information
30 content generation system
40 dimming apparatus 410 dimming element control unit
420 dimming element
51 illuminance sensor
52 front camera
53 in-vehicle monitoring camera
54 line-of-sight information generation unit

The invention claimed is:

1. A display dimming control apparatus, comprising:
a display image generator that determines a display device position that is a position of a display device that emits image light in order to display an image on a transparent screen from a display apparatus having the display device, the display image generator including a first processor and a first memory with a computer readable program stored therein; and
a dimming processing controller that controls a dimming apparatus having a plurality of dimming elements, wherein
the dimming processing controller includes a second processor and a second memory with a computer readable program stored therein,
the plurality of dimming elements independently control a dimming level of the screen for each of a plurality of tiles obtained by virtually dividing the screen,
the dimming processing controller is configured to:
    determine one or more dimming elements that control dimming levels of one or more tiles corresponding to a screen display position, the screen display position being a position on the screen at which the image is displayed by image light emitted from the display device position,
    determine visibility of each of the one or more tiles, and
    acquire background information that is information about a background environment of the screen and independently determine a dimming level for each of the one or more dimming elements on a basis of background information of each of the one or more tiles corresponding to the one or more dimming elements.

2. The display dimming control apparatus according to claim 1, wherein
the background information includes illuminance information that is information about illuminance of the background environment, and
the dimming processing controller is further configured to independently determine the dimming level for each of the one or more dimming elements on a basis of illuminance information of each of the one or more tiles corresponding to the one or more dimming elements.

3. The display dimming control apparatus according to claim 1, wherein
the dimming processing controller is further configured to:
    determine visibility of each of the one or more tiles, and
    independently determine, on a basis of the visibility, the dimming level for each of the one or more dimming elements.

4. The display dimming control apparatus according to claim 3, wherein
the background information includes background color information that is information about color of the background environment, and
the dimming processing controller is further configured to determine the visibility of each of the one or more tiles on a basis of background color information of each of the one or more tiles corresponding to the one or more dimming elements and image color information that is information about color of an image displayed for each of the one or more tiles.

5. The display dimming control apparatus according to claim 3, wherein
the background information includes luminance information that is information about luminance of the background environment, and
the dimming processing controller is further configured to determine the visibility of each of the one or more tiles on a basis of background luminance information of each of the one or more tiles corresponding to the one or more dimming elements and image luminance information that is information about luminance of an image displayed for each of the one or more tiles.

6. The display dimming control apparatus according to claim 3, wherein
the dimming processing controller is further configured to:
    generate position relationship information on a basis of line-of-sight information that is information indicating a line-of-sight of a viewer who views the image, the position relationship information being information for converting the display device position into one or more dimming elements that control dimming levels of one or more tiles corresponding to a screen display position, the screen display position being a position on the screen at which the image is displayed by image light emitted from the display device position, and
    determine the one or more dimming elements on a basis of the position relationship information.

7. The display dimming control apparatus according to claim 6, wherein
the dimming processing controller is further configured to determine the visibility also on a basis of line-of-sight information and the position relationship information, the line-of-sight information being information indicating a line-of-sight of a viewer who views the image.

8. The display dimming control apparatus according to claim 6, wherein
the line-of-sight information is estimated on a basis of positions of eyes of the viewer.

9. The display dimming control apparatus according to claim 6, wherein
the line-of-sight information is generated by dynamically measuring positions of eyes of the viewer and a line-of-sight of the viewer.

10. The display dimming control apparatus according to claim 9, wherein
the dimming processing controller is further configured to determine not to control dimming of one or more dimming elements corresponding to the screen display position when the determining that the viewer is not viewing the screen display position on a basis of the line-of-sight information.

11. The display dimming control apparatus according to claim 1, wherein
the screen has a freeform curved surface.

12. The display dimming control apparatus according to claim 1, wherein
the screen is a windshield of a vehicle.

13. The display dimming control apparatus according to claim 12, wherein
the display apparatus is a projection apparatus capable of projecting the image on an entire region in a width-wise direction of the windshield.

14. The display dimming control apparatus according to claim 1, wherein the screen is a window of a vehicle.

15. A display dimming control method, comprising:

determining a display device position that is a position of a display device that emits image light in order to display an image on a transparent screen from a display apparatus having the display device;

controlling a dimming apparatus having a plurality of dimming elements, the plurality of dimming elements independently controlling a dimming level of the screen for each of a plurality of tiles obtained by virtually dividing the screen;

determining one or more dimming elements that control dimming levels of one or more tiles corresponding to a screen display position, the screen display position being a position on the screen at which the image is displayed by image light emitted from the display device position; and acquiring background information that is information about a background environment of the screen and independently determines a dimming level for each of the one or more dimming elements on a basis of background information of each of the one or more tiles corresponding to the one or more dimming elements.

16. A non-transitory computer-readable recording medium recording a display dimming control program that causes:

a dimming processing controller, a display dimming control apparatus including;

a display image generator that determines a display device position that is a position of a display device that emits image light in order to display an image on a transparent screen from a display apparatus having the display device, the display image generator including a first processor and a first memory with a computer readable program stored therein, and the dimming processing controller that controls a dimming apparatus having a plurality of dimming elements, the plurality of dimming elements independently controlling a dimming level of the screen for each of a plurality of tiles obtained by virtually dividing the screen, and includes a second processor and a second memory with a computer readable program stored therein to:

determine one or more dimming elements that control dimming levels of one or more tiles corresponding to a screen display position, the screen display position being a position on the screen at which the image is displayed by image light emitted from the display device position; and acquire background information that is information about a background environment of the screen and independently determine a dimming level for each of the one or more dimming elements on a basis of background information of each of the one or more tiles corresponding to the one or more dimming elements.

17. A display dimming system, comprising:

a display apparatus that has a display device and displays an image on a transparent screen;

a dimming apparatus having a plurality of dimming elements, the plurality of dimming elements independently controlling a dimming level of the screen for each of a plurality of tiles obtained by virtually dividing the screen; and a display dimming control apparatus including:

a display image generator that determines a display device position that is a position of a display device that emits image light in order to display an image on the screen from the display apparatus, the display image generator including a first processor and a first memory with a computer readable program stored therein, and a dimming processing controller, the dimming processing controller includes a second processor and a second memory with a computer readable program stored therein and being configured to:

determine one or more dimming elements that control dimming levels of one or more tiles corresponding to a screen display position, the screen display position being a position on the screen at which the image is displayed by image light emitted from the display device position, and acquire background information that is information about a background environment of the screen and independently determine a dimming level for each of the one or more dimming elements on a basis of background information of each of the one or more tiles corresponding to the one or more dimming elements, the display dimming control apparatus controlling the dimming apparatus.

* * * * *